United States Patent
Volkerink et al.

(10) Patent No.: US 12,080,108 B1
(45) Date of Patent: Sep. 3, 2024

(54) SYSTEM FOR MONITORING VEHICLES FOR WEAR AND ANOMALOUS EVENTS USING WIRELESS SENSING DEVICES

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/670,420

(22) Filed: Feb. 11, 2022

Related U.S. Application Data

(60) Provisional application No. 63/148,602, filed on Feb. 11, 2021.

(51) Int. Cl.
| | |
|---|---|
| G07C 5/00 | (2006.01) |
| B60C 11/24 | (2006.01) |
| H04W 4/38 | (2018.01) |

(52) U.S. Cl.
CPC ............ G07C 5/008 (2013.01); B60C 11/246 (2013.01); H04W 4/38 (2018.02)

(58) Field of Classification Search
CPC ......... G07C 5/008; H04W 4/38; B60C 11/246
USPC ........................................................ 340/443
See application file for complete search history.

(56) References Cited

U.S. PATENT DOCUMENTS

| | | | |
|---|---|---|---|
| 4,785,463 | A | 11/1988 | Janc et al. |
| 5,999,091 | A | 12/1999 | Wortham |
| 6,437,702 | B1 | 8/2002 | Ragland et al. |
| 6,522,874 | B1 | 2/2003 | Chu et al. |
| 6,972,682 | B2 | 12/2005 | Lareau et al. |
| 7,273,172 | B2 | 9/2007 | Olsen, III et al. |
| 7,696,862 | B2 | 4/2010 | Herschell et al. |
| 7,866,555 | B2 | 1/2011 | Schmid et al. |
| 7,922,085 | B2 | 4/2011 | Thomas et al. |

(Continued)

FOREIGN PATENT DOCUMENTS

| | | |
|---|---|---|
| AU | 2018204317 A1 | 1/2019 |
| CA | 3008512 A1 | 12/2018 |

(Continued)

OTHER PUBLICATIONS

PCT Application No. PCT/US2020/055408, International Search Report and Written Opinion, dated Feb. 25, 2021, 11 pages.

(Continued)

*Primary Examiner* — Kerri L Mcnally
*Assistant Examiner* — Thang D Tran

(57) ABSTRACT

A wireless sensing system comprises a plurality of tape nodes and a gateway node associated with a vehicle of the wireless sensing system. Each of the plurality of tape nodes is adhered to a respective position on the vehicle, e.g., at corners of the undercarriage, and comprises one or more sensors configured to capture data describing the vehicle during operation. For example, the one or more sensors capture data describing a heatmap of tires of the vehicle and/or height of the vehicle. The plurality of tape nodes transmit the sensor data to the gateway node of the wireless sensing system. The gateway node detects anomalous events, such as misalignment of tires, flat tires, or sagging in the undercarriage, based at least in part on the tape nodes. Responsive to detecting an anomalous event, the gateway node transmits a notification to a user of the wireless sensing system.

20 Claims, 17 Drawing Sheets

(56) References Cited

U.S. PATENT DOCUMENTS

| | | | |
|---|---|---|---|
| 8,095,070 | B2 | 1/2012 | Twitchell, Jr. |
| 8,413,997 | B1* | 4/2013 | Coombs ............... B60G 17/017 |
| | | | 280/6.151 |
| 9,721,226 | B2 | 8/2017 | Minogue et al. |
| 9,886,799 | B2 | 2/2018 | Kwak |
| 10,244,364 | B1 | 3/2019 | Beard |
| 10,679,172 | B2 | 6/2020 | Burch, V et al. |
| 10,748,109 | B2 | 8/2020 | Benjamin et al. |
| 11,049,383 | B1* | 6/2021 | Shahamad ............ B60W 10/30 |
| 11,115,732 | B2* | 9/2021 | Lucrecio ............ G06Q 10/0833 |
| 11,487,985 | B2* | 11/2022 | Volkerink .......... G06K 19/0702 |
| 2003/0205869 | A1* | 11/2003 | Schutt ................. B60G 17/019 |
| | | | 280/5.514 |
| 2003/0227382 | A1 | 12/2003 | Breed |
| 2004/0224630 | A1 | 11/2004 | MacFarland |
| 2005/0028504 | A1* | 2/2005 | Gramm ................. A01D 41/06 |
| | | | 56/208 |
| 2005/0146423 | A1* | 7/2005 | Hattori ................. B60T 8/1725 |
| | | | 701/70 |
| 2006/0087419 | A1* | 4/2006 | Peng ................... B60C 23/0408 |
| | | | 701/31.4 |
| 2006/0197652 | A1 | 9/2006 | Hild et al. |
| 2007/0229240 | A1* | 10/2007 | Yasuda ............ B60G 17/01933 |
| | | | 340/442 |
| 2008/0100450 | A1 | 5/2008 | Ayyagari et al. |
| 2008/0147277 | A1* | 6/2008 | Lu ....................... B60W 30/085 |
| | | | 701/45 |
| 2008/0228352 | A1* | 9/2008 | Brookes ............... B60G 17/019 |
| | | | 280/5.514 |
| 2008/0252025 | A1* | 10/2008 | Plath ...................... B60G 9/003 |
| | | | 280/5.514 |
| 2009/0016308 | A1 | 1/2009 | Twitchell, Jr. |
| 2009/0018721 | A1* | 1/2009 | Mian ....................... G07C 5/00 |
| | | | 701/31.4 |
| 2009/0265038 | A1* | 10/2009 | Ramsey ............... F16C 37/005 |
| | | | 384/590 |
| 2012/0232942 | A1 | 9/2012 | Gaug et al. |
| 2014/0163857 | A1 | 6/2014 | Melum et al. |
| 2014/0344118 | A1 | 11/2014 | Parpia et al. |
| 2015/0206096 | A1 | 7/2015 | Fernandez |
| 2015/0239354 | A1* | 8/2015 | Gorai ................... B60L 53/122 |
| | | | 307/10.1 |
| 2015/0248838 | A1 | 9/2015 | Stone et al. |
| 2015/0375578 | A1* | 12/2015 | Patel ................... B60C 23/0489 |
| | | | 340/442 |
| 2016/0066137 | A1 | 3/2016 | Kulkarni et al. |
| 2017/0140656 | A1 | 5/2017 | Mott et al. |
| 2017/0243367 | A1* | 8/2017 | Lee ....................... H04N 25/704 |
| 2018/0039266 | A1 | 2/2018 | Dotzler et al. |
| 2018/0096289 | A1 | 4/2018 | Terwilliger et al. |
| 2018/0097884 | A1 | 4/2018 | Terwilliger et al. |
| 2018/0301875 | A1* | 10/2018 | Burroughs .......... H01S 5/02253 |
| 2018/0365636 | A1 | 12/2018 | Lucrecio et al. |
| 2019/0027048 | A1* | 1/2019 | Smith .................. G08G 5/0021 |
| 2019/0039431 | A1* | 2/2019 | Vaughan ............. F15B 13/0406 |
| 2019/0101650 | A1 | 4/2019 | McKeown et al. |
| 2019/0173912 | A1* | 6/2019 | Ujiie ........................ H04L 12/40 |
| 2019/0210518 | A1* | 7/2019 | Michalakis ............. B60Q 9/00 |
| 2019/0222055 | A1* | 7/2019 | Khoche ............. G06K 19/0704 |
| 2019/0236732 | A1 | 8/2019 | Speasl et al. |
| 2019/0315319 | A1* | 10/2019 | Williams .................. B60S 9/04 |
| 2019/0340483 | A1* | 11/2019 | Khoche ...................... C09J 7/20 |
| 2019/0362215 | A1* | 11/2019 | Khoche ................ H04W 4/029 |
| 2019/0370624 | A1* | 12/2019 | Khoche .................. H04W 4/80 |
| 2020/0032490 | A1* | 1/2020 | Ready-Campbell ...... E02D 3/02 |
| 2020/0051015 | A1* | 2/2020 | Davis ................. G06Q 10/0833 |
| 2020/0137360 | A1 | 4/2020 | Somers et al. |
| 2020/0217668 | A1* | 7/2020 | Cionca ...................... G06T 7/70 |
| 2020/0298646 | A1* | 9/2020 | Anderson ............ B60G 17/019 |
| 2020/0300960 | A1 | 9/2020 | Murphy et al. |
| 2020/0375106 | A1* | 12/2020 | Seiders, Jr. .......... A01D 41/145 |
| 2021/0009266 | A1* | 1/2021 | Lee ......................... G05D 1/101 |
| 2021/0031734 | A1* | 2/2021 | Wolf ..................... B62D 65/18 |
| 2021/0094377 | A1* | 4/2021 | Coerman ........... B60G 17/0193 |
| 2021/0133696 | A1* | 5/2021 | Volkerink .......... G06Q 10/0833 |
| 2021/0150159 | A1* | 5/2021 | Volkerink ........ G06K 19/07758 |
| 2021/0178836 | A1* | 6/2021 | Spencer ............. H01L 23/5387 |
| 2021/0284449 | A1 | 9/2021 | Rogers |
| 2021/0319683 | A1 | 10/2021 | Daw Perez et al. |
| 2022/0032704 | A1* | 2/2022 | Desourdy ............ B60G 17/052 |
| 2022/0161786 | A1* | 5/2022 | Javaid .................... G08G 1/166 |

FOREIGN PATENT DOCUMENTS

| | | | |
|---|---|---|---|
| WO | WO 2017109845 | A1 | 6/2017 |
| WO | WO 2018/053309 | A1 | 3/2018 |

OTHER PUBLICATIONS

Examination Report No. 1 for Australian Patent Application No. 2020368350 dated Sep. 30, 2022, 6 pages.
Examination Report No. 2 for Australian Patent Application No. 2020368350 dated Apr. 24, 2023, 5 pages.
Examination Report No. 3 for Australian Patent Application No. 2020368350 dated Sep. 21, 2023, 6 pages.
Examination Report No. 4 for Australian Patent Application No. 2020368350 dated Sep. 28, 2023, 5 pages.
Examination Report No. 1 for Australian Patent Application No. 2020216093 dated Sep. 29, 2022, 4 pages.
International Preliminary Report on Patentability for International Patent Application No. PCT/US2020/014521 dated Jul. 27, 2021, 6 pages.
Office Action for Canadian Patent Application No. 3,128,524 dated Oct. 12, 2022, 6 pages.
Partial Supplementary European Search Report for European Patent Application No. 20747574.0 dated Sep. 16, 2022, 3 pages.

* cited by examiner

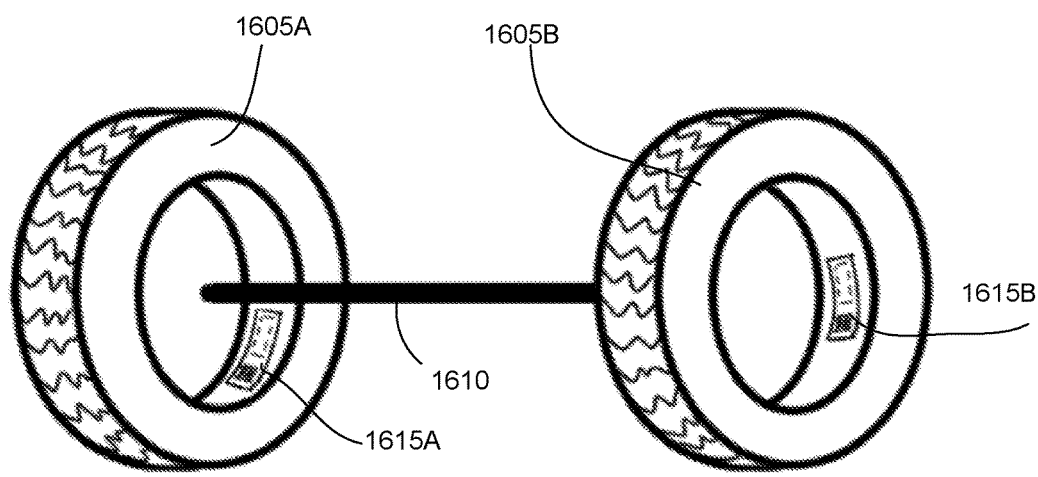
FIG. 16A
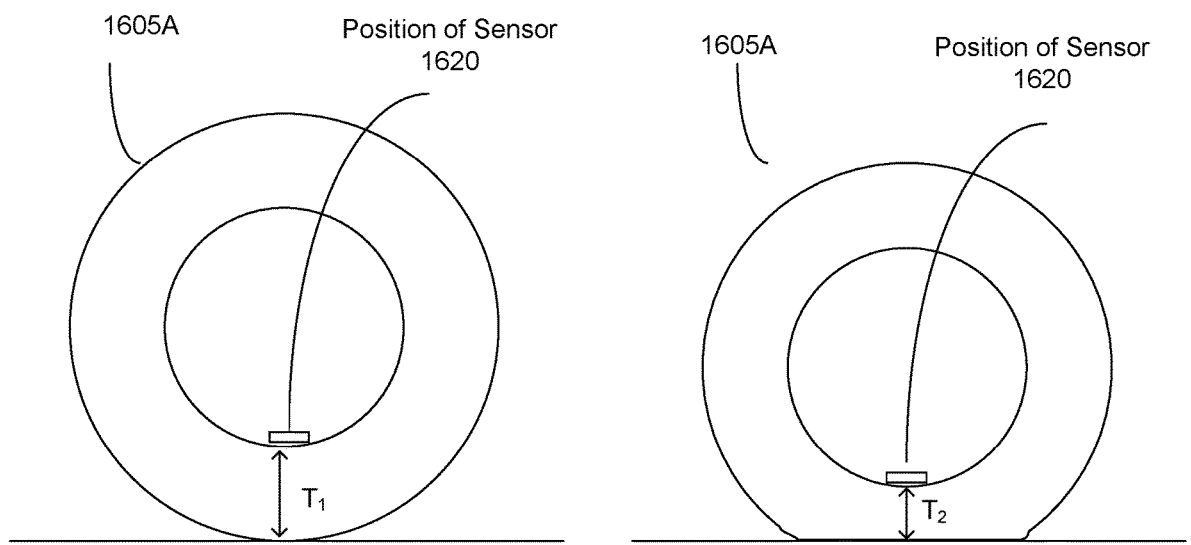
FIG. 16B
FIG. 16C

SYSTEM FOR MONITORING VEHICLES FOR WEAR AND ANOMALOUS EVENTS USING WIRELESS SENSING DEVICES

CROSS-REFERENCE TO RELATED APPLICATIONS

This application claims priority to U.S. Provisional Patent Application No. 63/148,602, filed Feb. 11, 2021, which is incorporated herein in its entirety.

FIELD OF THE DISCLOSURE

This disclosure generally relates to wireless internet of things (IoT) devices and, in particular, to vehicle diagnostic monitoring.

BACKGROUND

Frequently used vehicles, such as those used for transportation of assets, experience wear and tear over the course of their lifetime. In particular, vehicles often experience wear and tear on tires, which may lead to costly repairs and expenses. The required repairs, and consequently the expenses, may be exacerbated due to misalignment in tires, such as when one or more tires have substantially less air pressure than one or more other tires of the vehicle, or may be exacerbated when malfunctions go unnoticed or unidentified during transportation, such as when one or more tires are flat. For a fleet of vehicles, it may be difficult to track the condition of a large number of vehicles and perform maintenance on a timely basis.

SUMMARY

A wireless sensing system tracks the condition of tires on a vehicle and other parts of the vehicle by using wireless sensing devices placed on portions of the vehicle. The wireless sensing devices are configured to measure sensing data and wirelessly communicate the measured sensing data to the wireless sensing system. In some embodiments, a wireless sensing system uses surface temperature of tires as a proxy for wear on the tire. While tires unavoidably experience wear over the course of a lifetime on a vehicle, standard patterns of wear, e.g., as experienced by tires aligned and filled correctly, impact performance and chance of catastrophic failure less than abnormal patterns of wear, e.g., as experienced by tires misaligned on the axle, over- or underinflated, or experiencing high cargo weight during journeys.

The wireless sensing system comprises a plurality of wireless sensing devices (also referred to herein as "tape nodes") and a gateway node associated with a vehicle of the wireless sensing system. Each of the plurality of tape nodes and the gateway node is adhered or affixed to respective positions on the vehicle, or is integrated into a component of the vehicle (e.g., as a smart wheel, smart tire, and/or smart rim). For example, a tape node is adhered to each of a vehicle's wheelhouses or wheel wells, to regular positions along the undercarriage of the vehicle, or to tires of the vehicle, and a gateway node is adhered to an interior of the vehicle, e.g., in a bed of a truck, a cab of a vehicle, or the like. Each tape node of the plurality of tape node comprises one or more sensors. In some embodiments, the one or more sensors are configured to capture data describing surface temperature of tires of the vehicle. For example, the sensor may be one or more of: an infrared camera, a temperature sensor, a temperature probe. In other embodiments, the one or more sensors are configured to capture data describing a current height of the tape node. For example, the sensor may be one or more of: a time-of-flight sensor, a light sensor, and an ultrasonic sensor.

In some embodiments, each tape node of the plurality of tape nodes further comprises a communications system configured to transmit information to one or more of: other tape nodes of the wireless sensing system, gateway nodes of the wireless sensing system, clouds or servers of the wireless sensing system, client devices of the wireless sensing system, and other entities of the wireless sensing system.

In an embodiment, the plurality of tape nodes transmit the captured sensor data to the gateway node of the wireless sensing system. The gateway node of the wireless sensing system receives the captured sensor data and determines, based on the captured sensor data, whether an anomalous event has occurred. The gateway node may also wirelessly communicate the captured sensor data and other data to other members of the wireless sensing system, such as a server or cloud of the wireless sensing system.

In embodiments wherein the one or more sensors are configured to capture data describing surface temperature of tires of the vehicle, the wireless sensing devices generate heatmaps of tires based on the captured surface temperature and determine, based on the generated heatmaps, whether a tire is experiencing abnormal wear, anomalous events, or the like. For example, the wireless sensing devices may compare patterns in a generated heatmap to historic heatmaps, baseline heatmaps, and the like.

In embodiments wherein the one or more sensors are configured to capture data describing a current height of the wireless sensing device, the gateway node determines that a first portion of the vehicle is significantly lower than one or more other portions of the vehicle and may be experiencing an anomalous event (e.g., a flat tire). In another example, the gateway node determines that a first portion of the vehicle is operating at a height below a threshold height, e.g., wherein the threshold height is determined based on a location of the tape nodes on the vehicle, and may be experiencing an anomalous event. In another embodiment, a tape node of the plurality of tape nodes is configured to receive the captured sensor data from the other tape nodes of the plurality of tape nodes and to perform the one or more determinations based on the captured sensor data.

In some embodiments, one or more of the plurality of tape nodes and/or the gateway node is configured to retrieve information from one or more onboard systems (e.g., an onboard computer) of the vehicle. For example, the gateway node may retrieve information describing the vehicle from a tire-monitoring system or a tire pressure sensor of the vehicle. The retrieved information may be compared with the captured sensor data of the tape nodes to identify potential discrepancies or conflicts between the onboard systems of the vehicle and the captured sensor data of the plurality of tape nodes. In some embodiments, discrepancies or conflicts may be used to narrow down potential types of anomalous events that are occurring. For example, if a tire pressure sensor of a vehicle reads high pressure but sensor data corresponding to the portion of the vehicle above the tire indicates that the vehicle is too close to the ground, the gateway node may determine that the axle of the truck is misaligned.

Responsive to an anomalous event being detected and/or identified, the gateway node is configured to transmit a notification to a user of the wireless sensing system. In some embodiments, the gateway node transmits a notification to a client device of the user of the wireless sensing system. In other embodiments, the gateway node transmits information describing the anomalous event to a cloud or server of the wireless sensing system, which is configured to provide the notification to the user of the wireless sensing system (e.g., via an application or other user interface).

A method for monitoring vehicles and detecting anomalous events using tape nodes is also described herein. An entity of the wireless sensing system receives sensor data from a plurality of sensors associated with a vehicle. The sensor data describes a height corresponding to a portion of a vehicle. The height may be directly described (e.g., in inches, in centimeters) or may be indirectly described (e.g., as a function of pressure, time-of-flight of a signal, or the like). Based on the received sensor data, the entity of the wireless sensing system detects that at least one portion of the vehicle corresponds to sensor data indicating an anomalous event. For example, sensor data indicating an anomalous event may comprise a height being below a threshold value, a difference in height between two or more sets of sensor data being more than a threshold value, a change in height over time being more than a threshold value, or the like. Responsive to detecting the anomalous event, the entity of the wireless sensing system transmits a notification to a user of the wireless sensing system.

In some embodiments, the steps of the method described herein are performed by a tape node of the wireless sensing system. In other embodiments, one or more of steps may be performed by a gateway node of the wireless sensing system, a cloud or server of the wireless sensing system, or another entity of the wireless sensing system.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

BRIEF DESCRIPTION OF THE DRAWINGS

FIGS. 16A-16C are diagrammatic views illustrating tires of vehicles monitored using tape nodes, according to some embodiments.

DETAILED DESCRIPTION

Figure 1A:
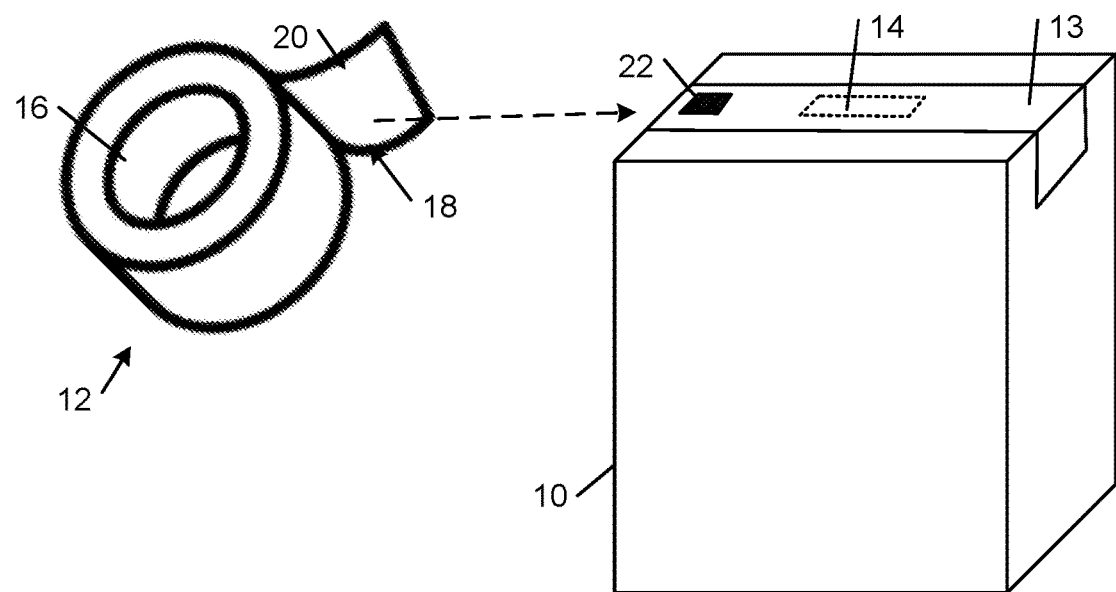
FIG. 1A is a diagrammatic view of an asset that has been sealed for shipment using a segment of an example adhesive tape platform dispensed from a roll, according to some embodiments.

A wireless sensing system tracks the condition of tires on a vehicle and other parts of the vehicle by using wireless sensing devices (also referred to herein as "wireless IoT devices") placed on portions of the vehicle. The wireless sensing devices are configured to measure sensing data and wirelessly communicate the measured sensing data to the wireless sensing system. In some embodiments, a wireless sensing system uses surface temperature of tires as a proxy for wear on the tire. While tires unavoidably experience wear over the course of a lifetime on a vehicle, standard patterns of wear, e.g., as experienced by tires aligned and filled correctly, impact performance and chance of catastrophic failure less than abnormal patterns of wear, e.g., as experienced by tires misaligned on the axle, over- or under-inflated, or experiencing high cargo weight during journeys.

The wireless sensing system comprises a plurality of wireless sensing devices and a gateway node associated with a vehicle of the wireless sensing system. Each of the wireless sensing devices and the gateway node is adhered or affixed to respective positions on the vehicle, or is integrated into a component of the vehicle (e.g., as a smart wheel, smart tire, and/or smart rim).

In some embodiments, the wireless IoT sensing device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

INTRODUCTION

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
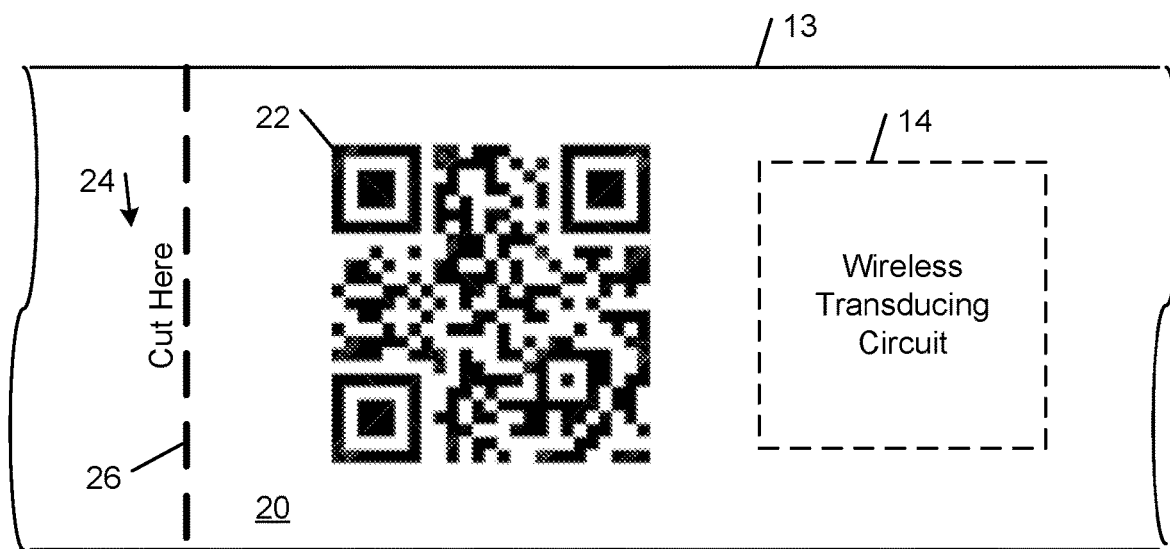
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
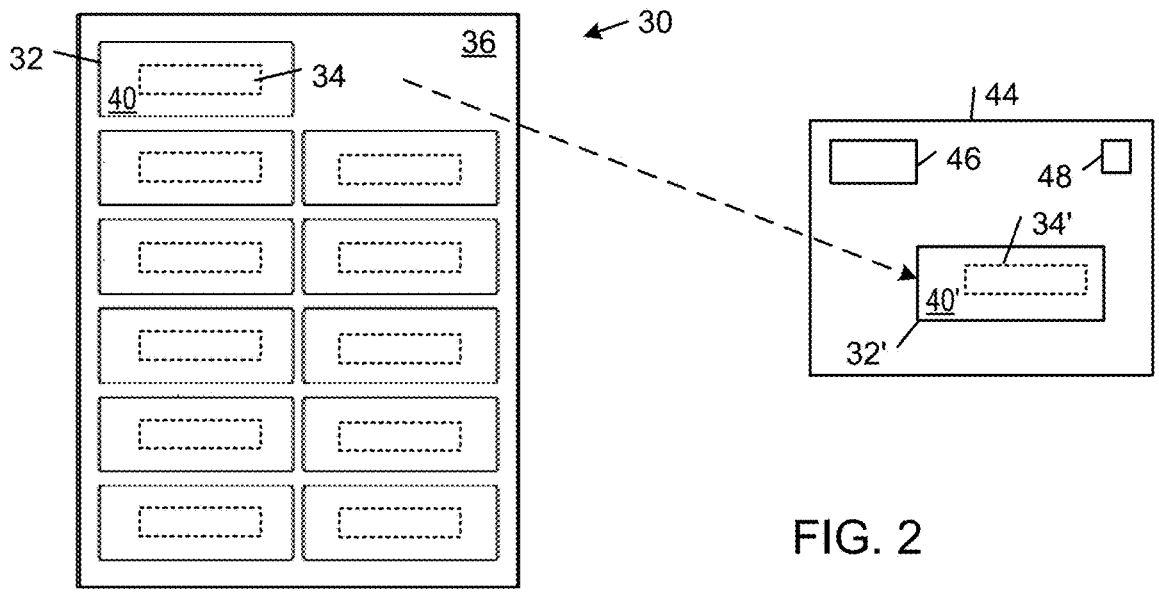
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
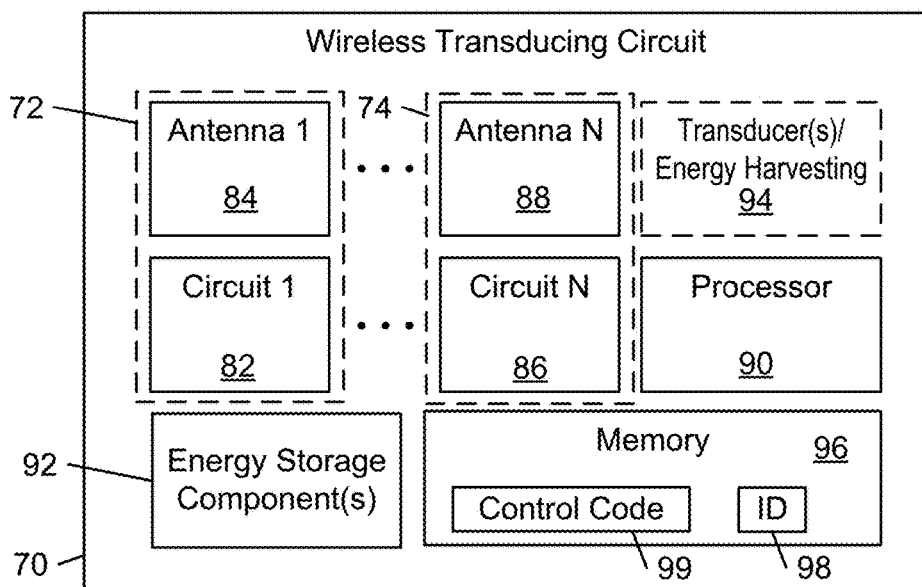
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
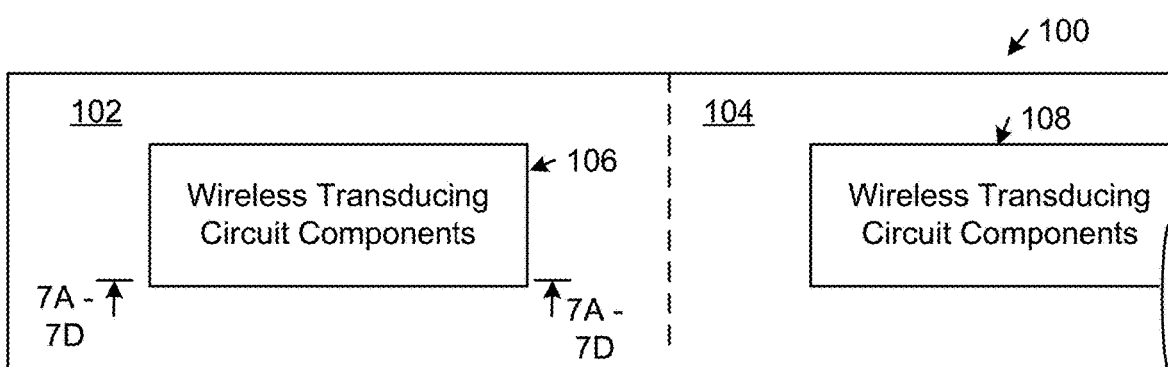
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
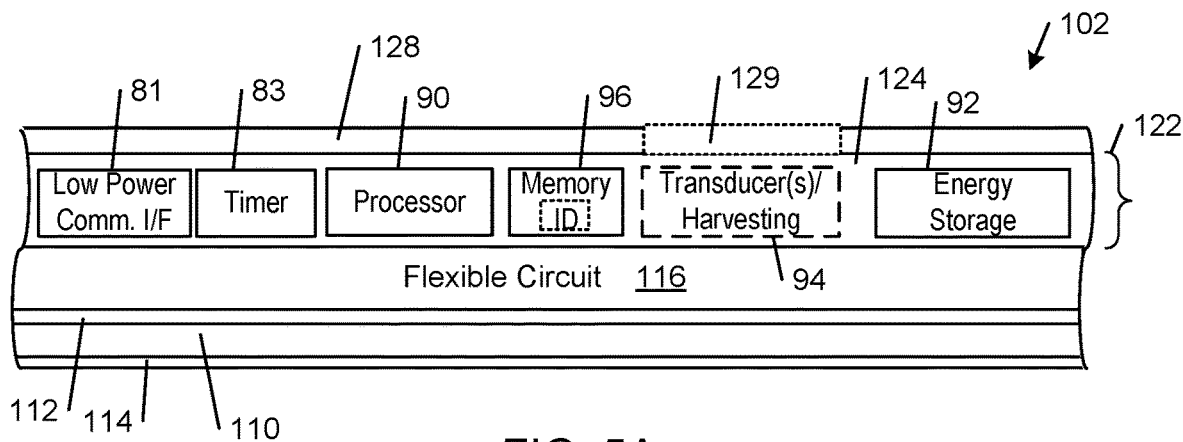
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
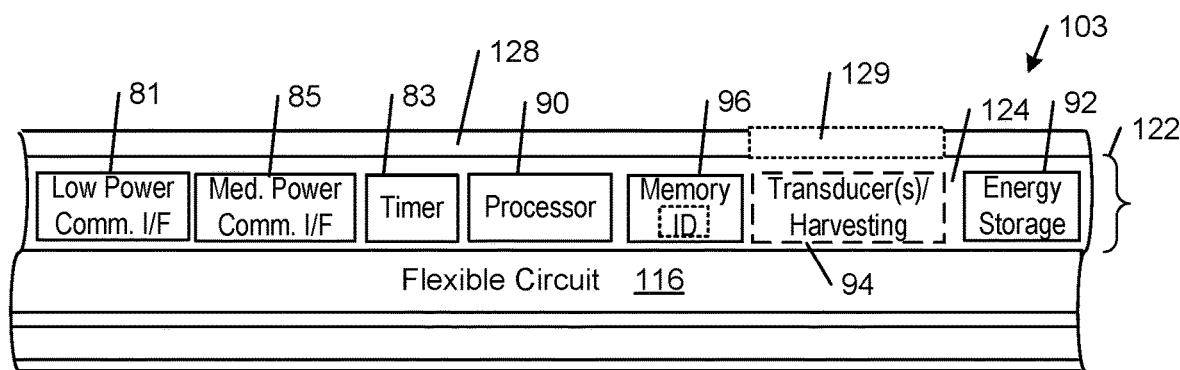

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
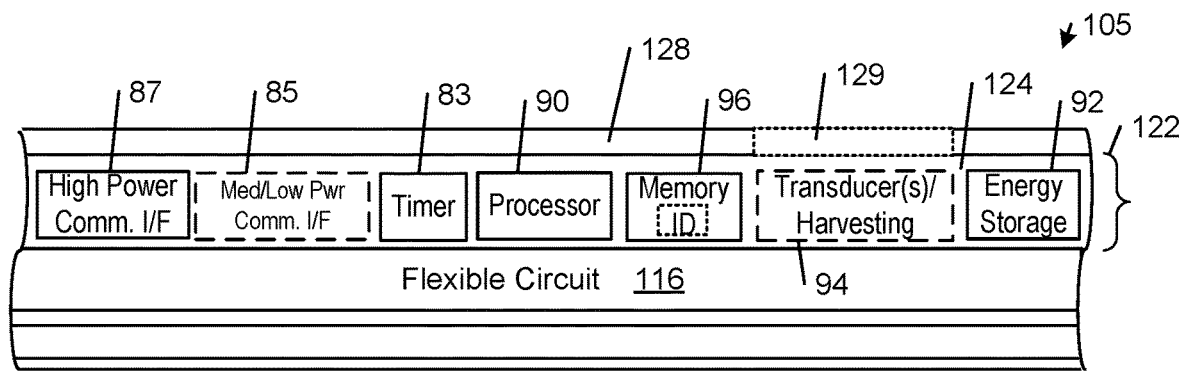

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
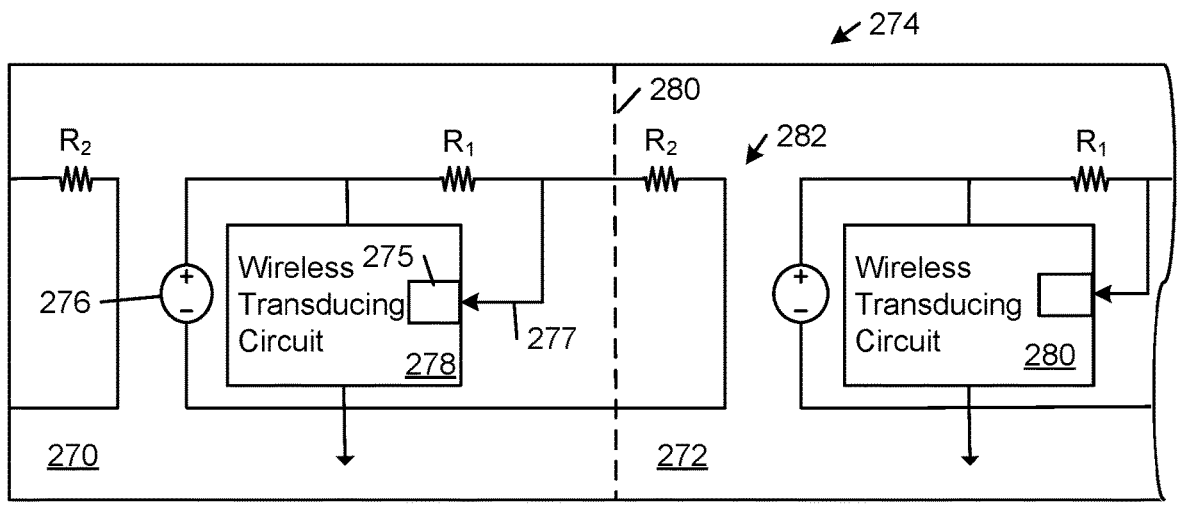
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
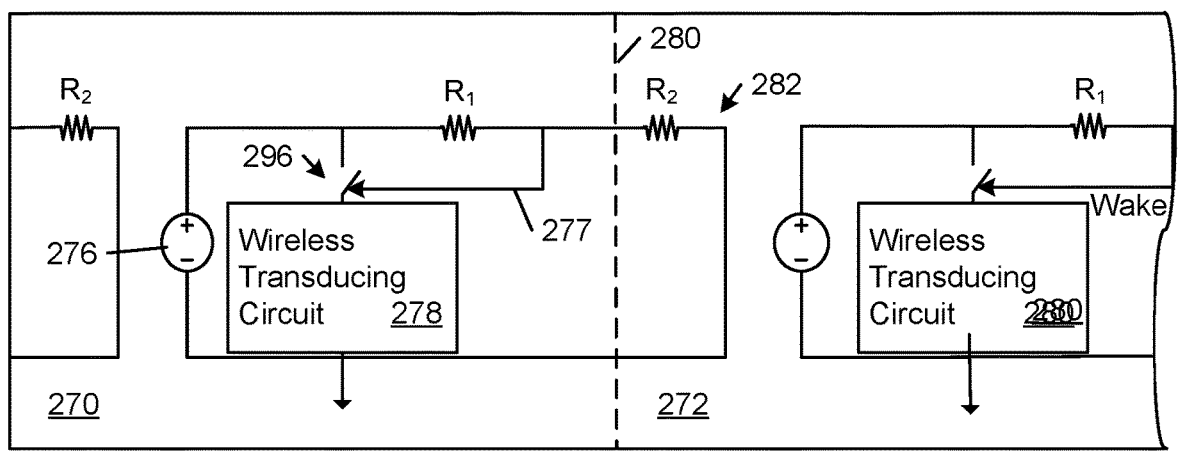

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
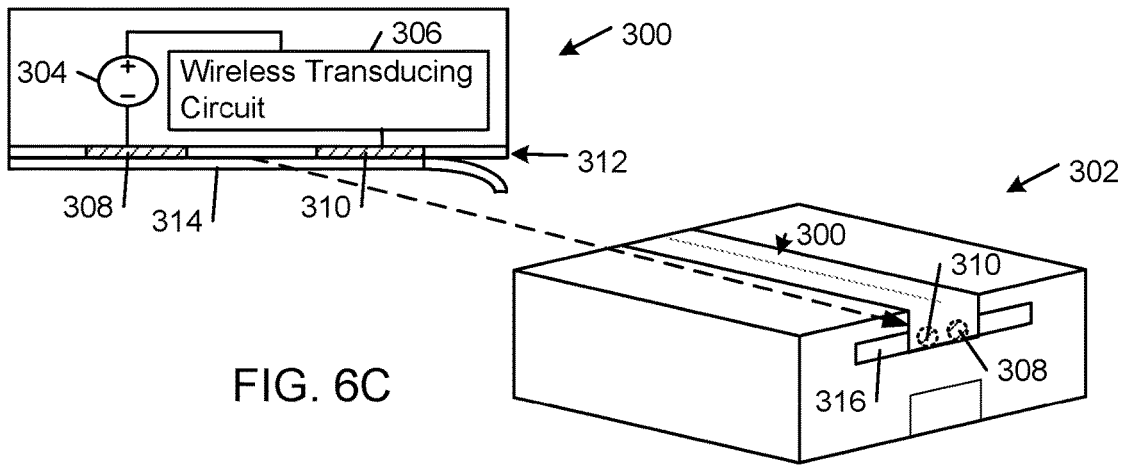
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
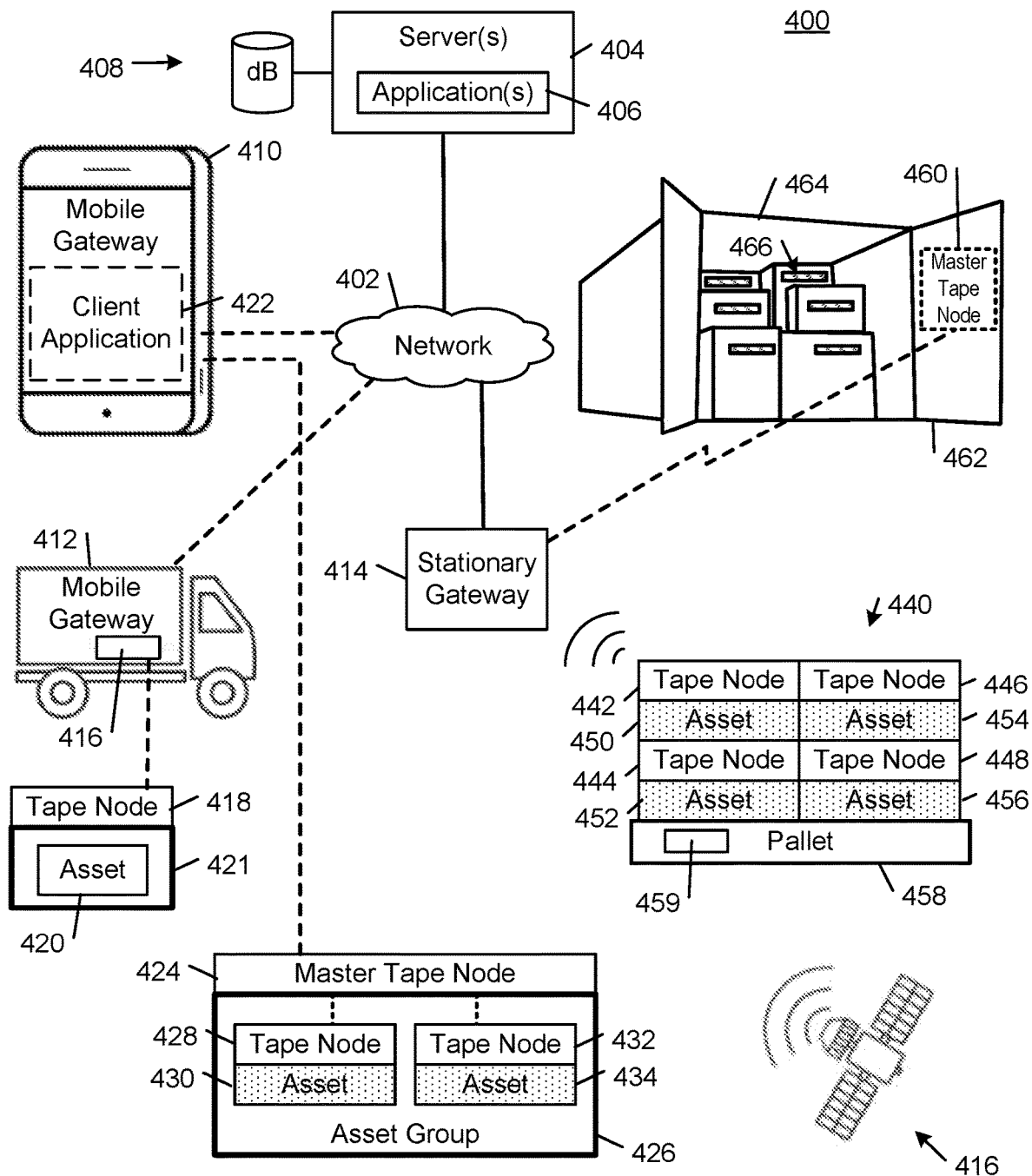
FIG. 7 is a diagrammatic view of an example of a network environment supporting communications with segments of an adhesive tape platform, according to some embodiments.

FIG. 7 shows an example network communications environment 400 (also referred to herein as an "IoT system" or "wireless sensing system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IoT system 400 may be referred to as a node of the IoT system 400, including the tape nodes, other wireless IoT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
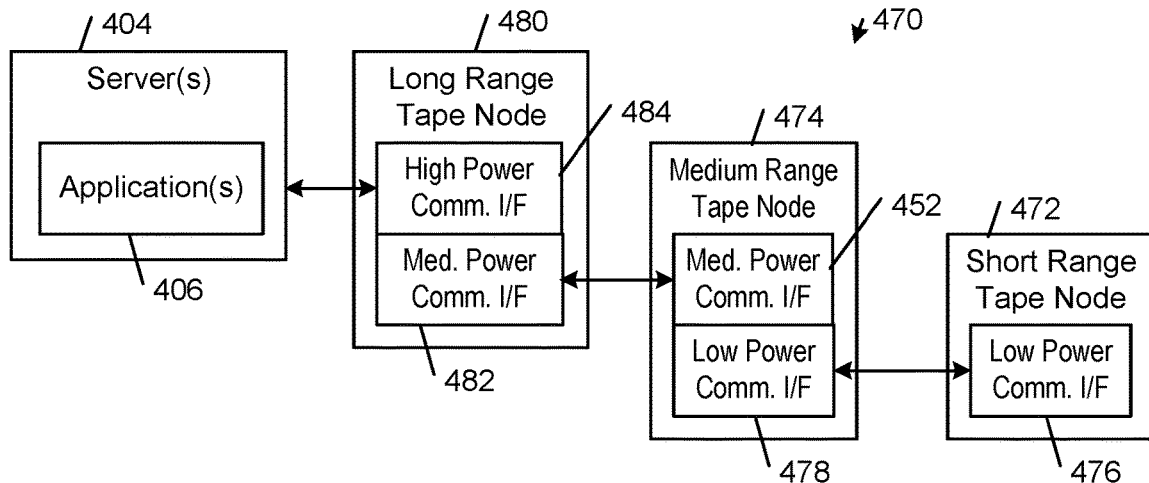
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
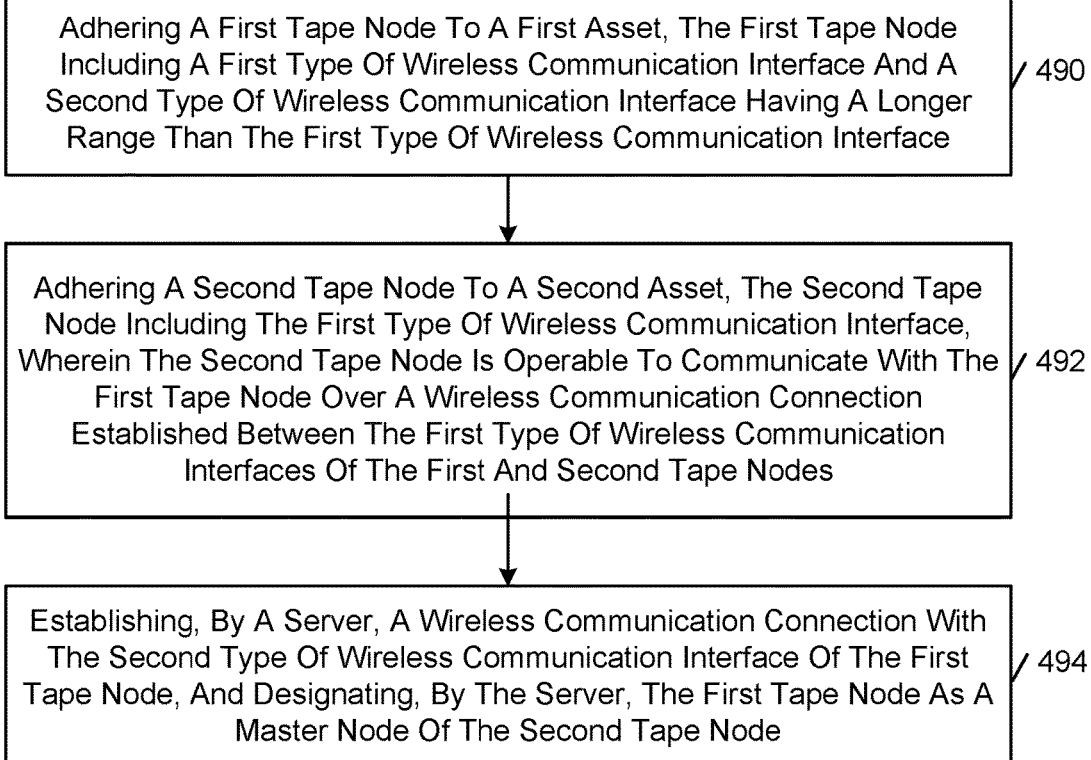
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
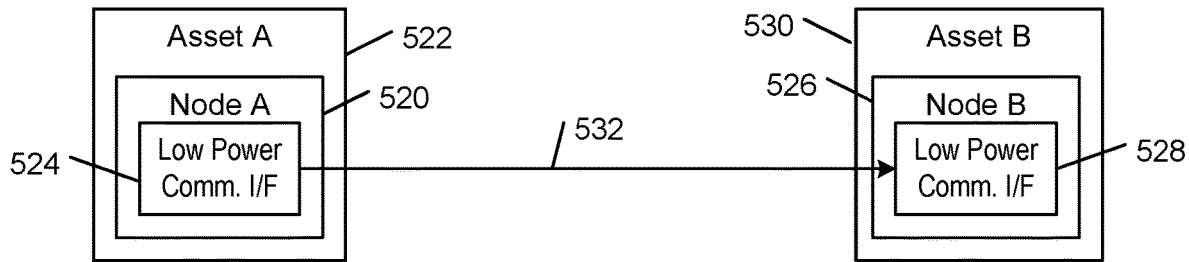
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
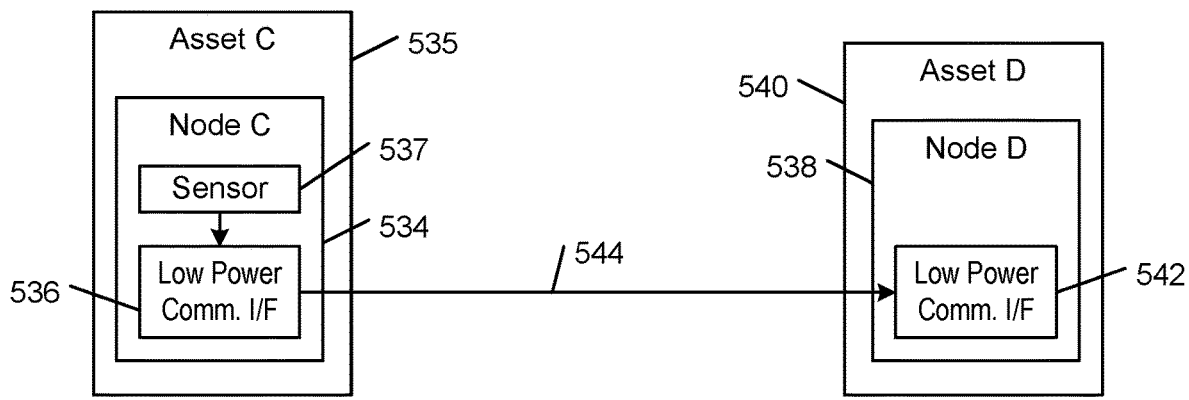

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
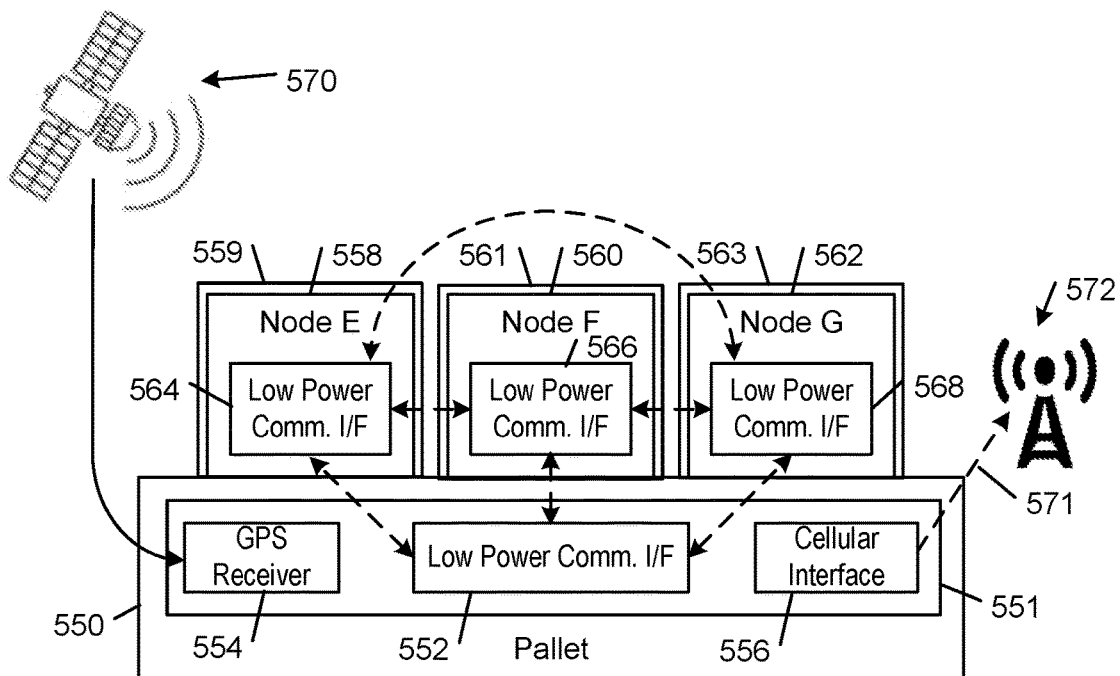

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
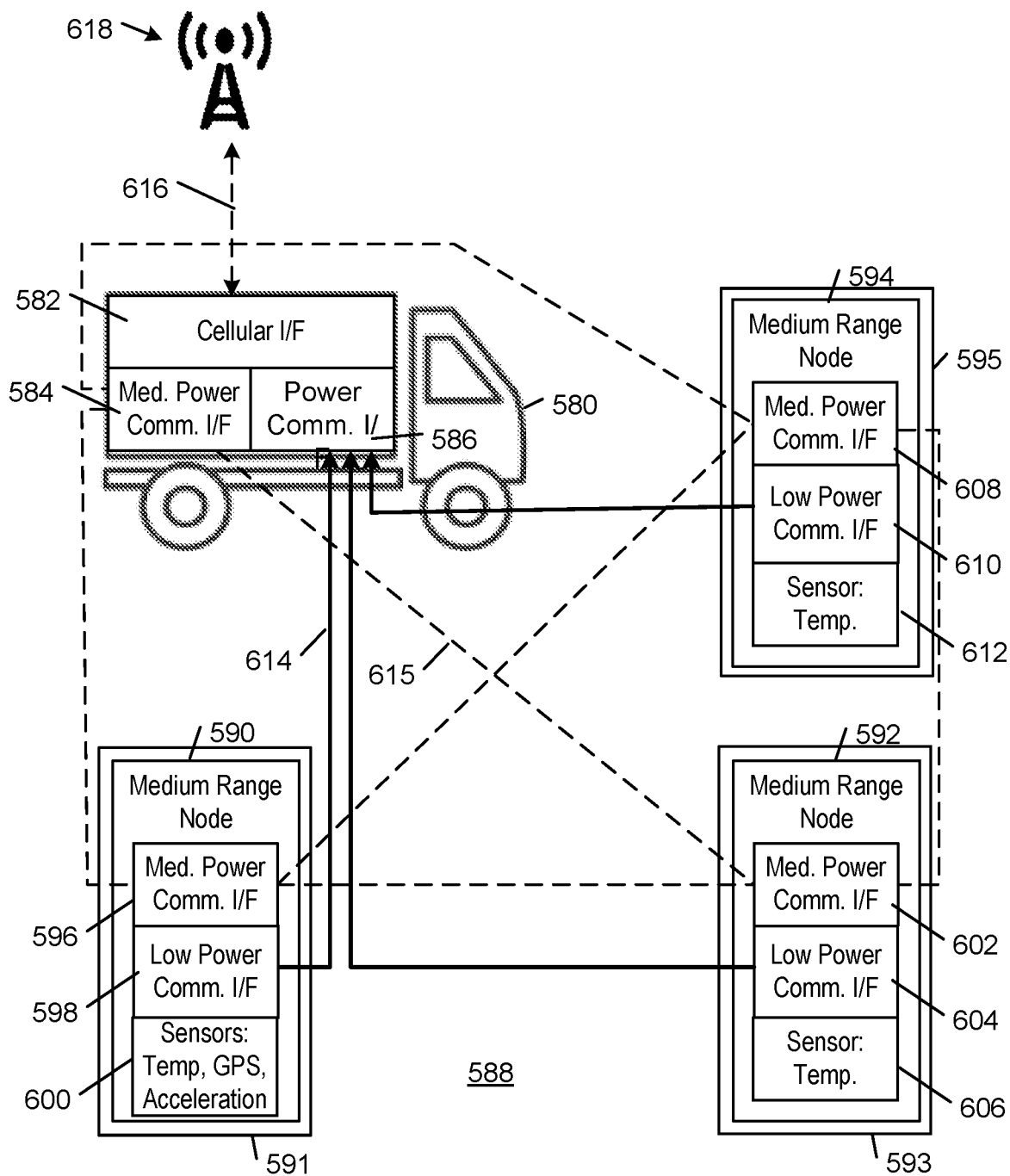

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
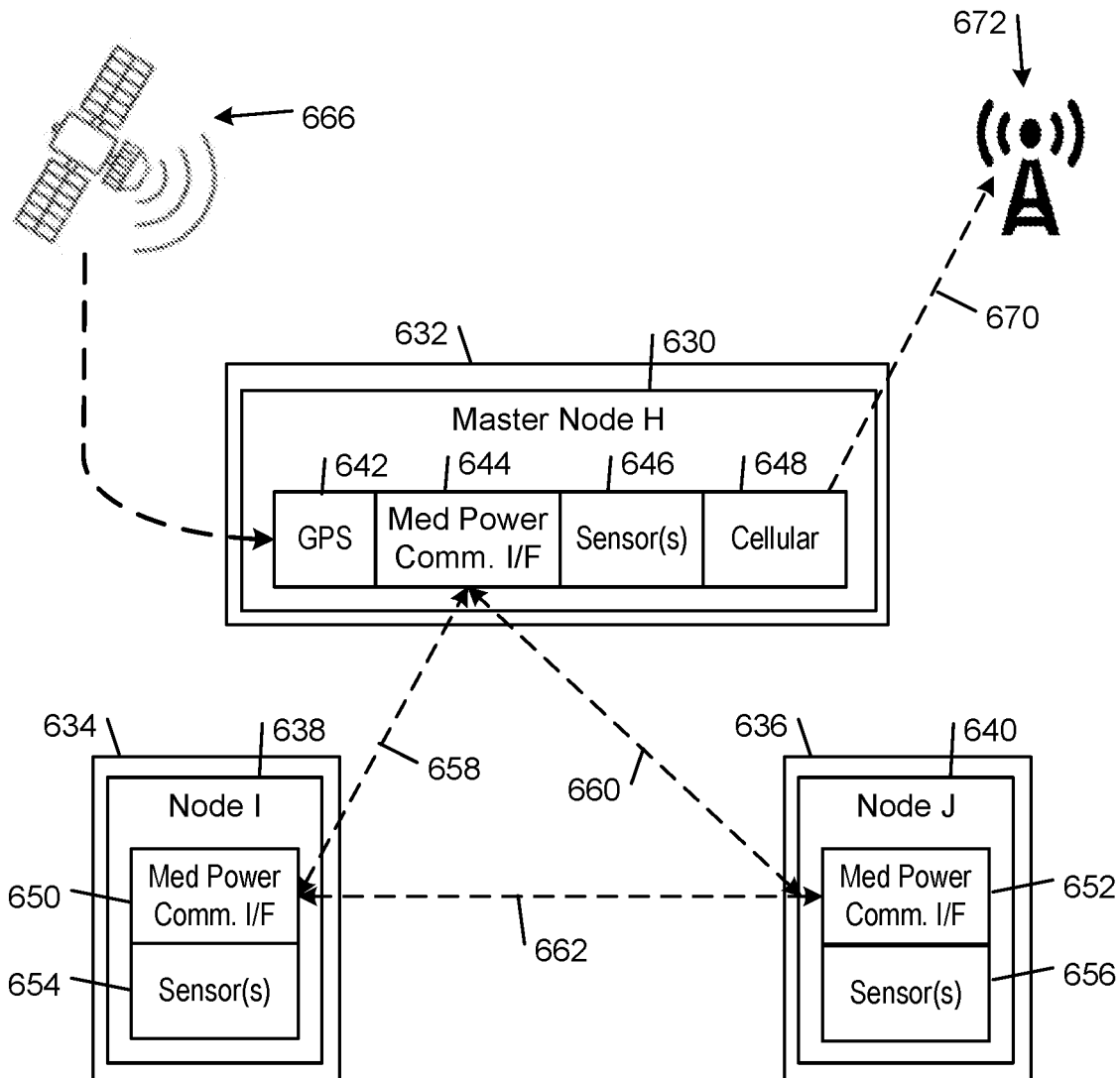

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Monitoring Vehicles for Anomalous Events

A wireless sensing system comprises a plurality of wireless sensing devices and a gateway node associated with a vehicle of the wireless sensing system. The wireless sensing device is configured to measure sensing data using one or more sensors integrated in the wireless sensing device and wirelessly communicate the sensing data to the wireless sensing system using at least one wireless communication system of the wireless sensing device. The wireless sensing device is an embodiment of the adhesive tape platform, according to some embodiments. In other embodiments, the wireless sensing device has another form factor. The wireless sensing device may also be referred to below as a "tape node." Each of the plurality of tape nodes is adhered to respective positions on the vehicle. For example, a tape node is adhered to each of a vehicle's wheelhouses, to regular positions along the undercarriage of the vehicle, or to tires of the vehicle. In some embodiments, the gateway node is additionally positioned in or on the vehicle. For example, a gateway node is adhered to an interior of the vehicle, e.g., in a bed of a truck, a cab of a vehicle, or the like. Each tape node of the plurality of tape node comprises one or more sensors, including at least a sensor configured to capture data describing a current height of the tape node. For example, the sensor may be one or more of: a time-of-flight sensor, a light sensor, an ultrasonic sensor, a light detection and ranging LiDAR sensor, an infrared distance sensor, a laser distance sensor, and another type of distance or height sensor.

In some embodiments, the wireless sensing device includes two parts, a sensing part and a wireless communication part separate from the sensing part. The sensing part includes the one or more sensors and is coupled to the wireless communication part which includes the at least one wireless communication system. The sensing part may be electronically coupled to the wireless communication part via a wire or cable or, in other embodiments, may be wirelessly coupled to the wireless communication part via a respective wireless communication system common to both the wireless communication part and the sensing part. The sensing part generates sensing data using the sensor and provides the sensing data to the wireless communication part, which in turn relays the data to other nodes of the wireless sensing system, according to software and/or firmware installed on the wireless sensing device. The wireless communication part may also house other components such as a processor, a memory and/or storage, additional wireless communication system, a circuit coupled to the components, circuit elements, and other components.

In some embodiments, each tape node of the plurality of tape nodes further comprises a communications system configured to transmit information to one or more of: other tape nodes of the wireless sensing system, gateway nodes of the wireless sensing system, clouds or servers of the wireless sensing system, client devices of the wireless sensing system, and other entities of the wireless sensing system.

While the vehicle is in operation, the plurality of tape nodes is configured to capture sensor data describing the vehicle. In an embodiment, the plurality of tape nodes transmit the captured sensor data to the gateway node of the wireless sensing system. The gateway node of the wireless sensing system receives the captured sensor data and determines, based on the captured sensor data, whether an anomalous event has occurred. For example, the gateway node determines that a first portion of the vehicle is significantly lower than one or more other portions of the vehicle and may be experiencing an anomalous event (e.g., a flat tire). In another example, the gateway node determines that a first portion of the vehicle is operating at a height below a threshold height, e.g., wherein the threshold height is determined based on a location of the tape nodes on the vehicle, and may be experiencing an anomalous event. In another embodiment, a tape node of the plurality of tape nodes is configured to receive the captured sensor data from the other tape nodes of the plurality of tape nodes and to perform the one or more determinations based on the captured sensor data.

In some embodiments, one or more of the plurality of tape nodes and/or the gateway node is configured to retrieve information from one or more onboard systems of the vehicle. For example, the gateway node may retrieve information describing the vehicle from a tire-monitoring system or a tire pressure sensor of the vehicle. The retrieved information may be compared with the captured sensor data of the tape nodes to identify potential discrepancies or conflicts between the onboard systems of the vehicle and the captured sensor data of the plurality of tape nodes. In some embodiments, discrepancies or conflicts may be used to narrow down potential types of anomalous events that are occurring. For example, if a tire pressure sensor of a vehicle reads high pressure but sensor data corresponding to the portion of the vehicle above the tire indicates that the vehicle is too close to the ground, the gateway node may determine that the axle of the truck is misaligned or that another mechanical failure has occurred.

Responsive to an anomalous event being detected and/or identified, the gateway node is configured to transmit a notification to a user of the wireless sensing system. In some embodiments, the gateway node transmits a notification to a client device of the user of the wireless sensing system. In other embodiments, the gateway node transmits information describing the anomalous event to a cloud or server of the wireless sensing system, which is configured to provide the notification to the user of the wireless sensing system (e.g., via an application or other user interface).

Figure 11A:
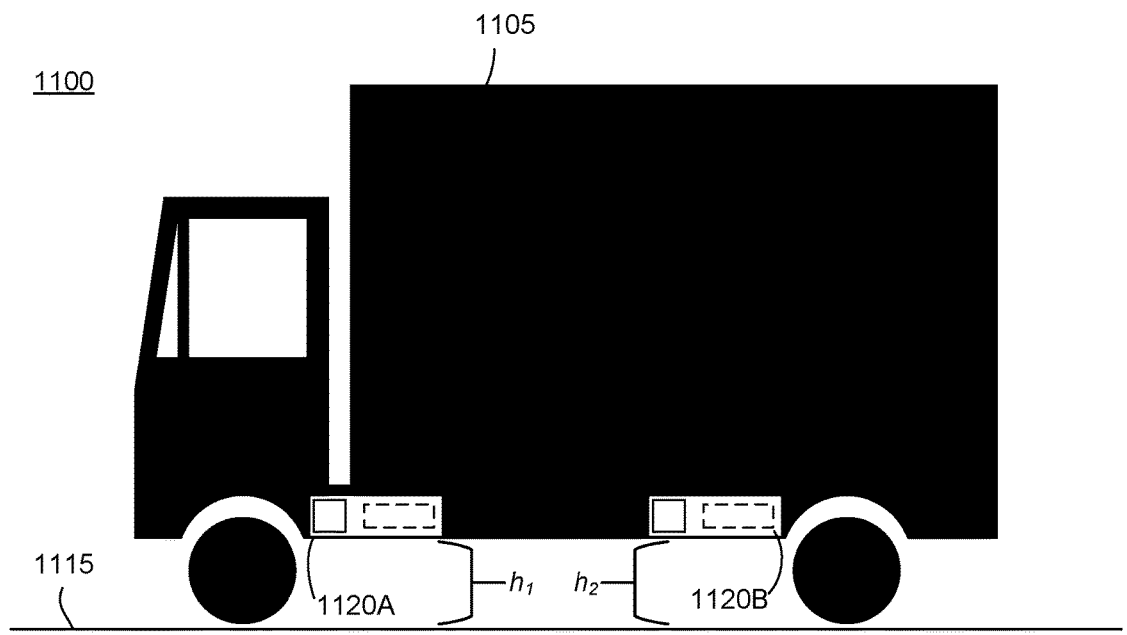
FIGS. 11A-11B are diagrammatic views illustrating vehicles monitored for anomalous events using tape nodes, according to some embodiments.
Figure 11B:
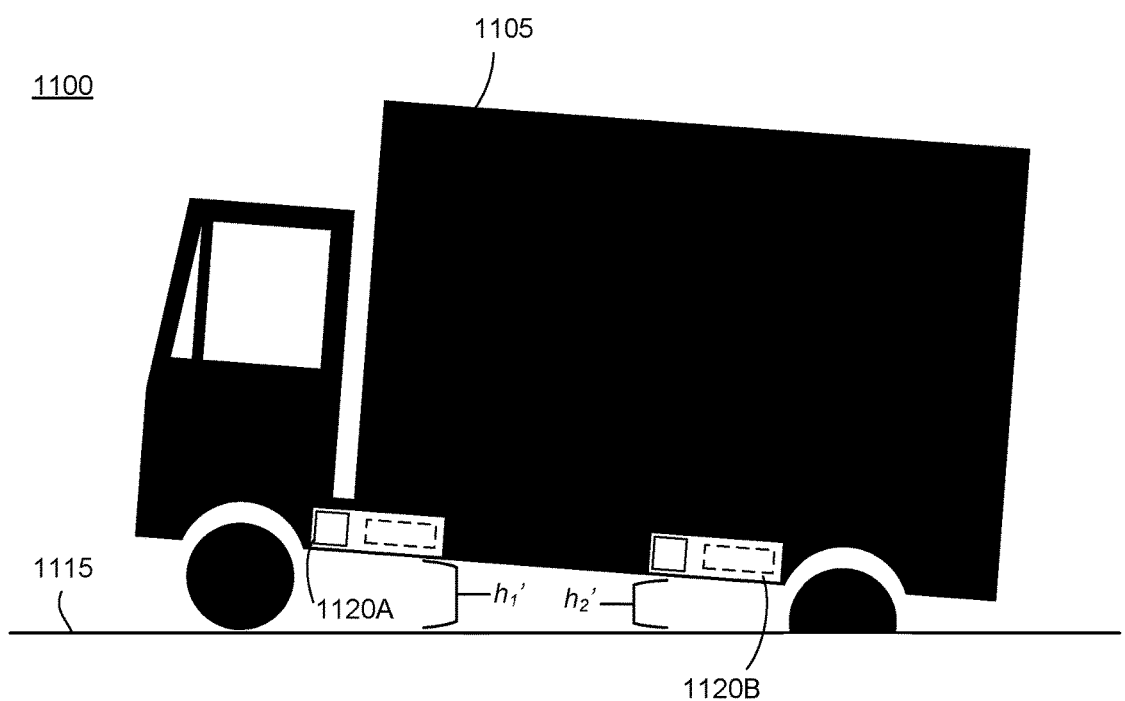

FIGS. 11A-11B are diagrammatic views illustrating vehicles monitored for anomalous events using tape nodes. FIG. 11A illustrates an environment 1100 comprising a vehicle 1105 on a road 1115 or other flat surface. A plurality of tape nodes 1120 are adhered to a surface of the vehicle 1105. In the embodiment of FIGS. 11A-B, two tape nodes 1120A, 1120B are illustrated adhered to an undercarriage of the vehicle 1105; however, in other embodiments, additional or fewer tape nodes may be adhered to the vehicle or the tape nodes may be adhered to different positions on the vehicle. For example, in some embodiments a pair of tape nodes 1120 may be adhered to the undercarriage on a far side of the vehicle, and are not depicted in FIG. 11A for clarity. In another example, a plurality of tape nodes 1120 may be adhered to wheel wells or wheelhouses of the vehicle 1105, or may be adhered to the tires of the vehicle. In some examples, the tape nodes 1120 are attached to one or more of a rim of a wheel, an axle of the vehicle, or some other portion of the vehicle.

The tape nodes 1120 comprise one or more sensors configured to capture data describing a height of the tape node or a distance of the tape node from a surface, e.g., a distance from the tape node to the ground or road 1115, a distance from the tape node to the undercarriage of the vehicle 1105, a distance from the tape node to a tire, or the like. In some embodiments, the one or more sensors include at least one of: a time-of-flight sensor, a light sensor, and an ultrasonic sensor. In an embodiment, the tape nodes 1120 are positioned on the undercarriage of the vehicle 1105 as illustrated in FIG. 11A and are oriented such that the one or more sensors capture a distance between the tape nodes and the road 1115. As shown in FIG. 11A, a distance between a first tape node 1120A and the road 1115 represents a current height h1 of the first tape node 1120A, and a distance between a second tape node 1120B and the road 1115 represents a current height h2 of the second tape node 1120B.

During standard operation of the vehicle 1105, a height h1 of the first tape node and a height h2 of the second tape node are within threshold values corresponding to an expected height of a tire of the vehicle at high pressure. In some embodiments, during standard operation of the vehicle 1105, a height h1 of the first tape node and a height h2 of the second tape node are maintained within a threshold value of each other. The measured heights h1 and h2 may be used to determine a weight of loaded cargo in the vehicle 1105 or load balancing of the cargo, according to some embodiments. An increase in loaded weight on the vehicle 1105 may result in smaller measured heights h1 and h2. Similarly, an unbalanced load of weight on the vehicle 1105 may result in non-uniformity among the measured heights h1 and h2, according to some embodiments.

FIG. 11B illustrates the environment 1100 of FIG. 11A, comprising the vehicle 1105, road 1115, and plurality of tape nodes 1120 as described previously. In FIG. 11B, a rear tire of the vehicle 1105 is flat, causing a change in the current height h2' of the second tape node, while the current height h1' of the first tape node may be unchanged or may be less substantially changed. The tape nodes 1120 capture sensor data describing the current heights h1' and h2'. In an embodiment, the tape nodes 1120 transmit the captured sensor data to a gateway node in the environment (not illustrated). The gateway node may perform one or more analyses on the captured sensor data. For example, the gateway node may determine that a current height h2' of the second tape node is below a threshold value. In another example, the gateway node may determine that a current height h1' of the first tape node and a current height h2' of the second tape node are substantially different.

Responsive to the determining, the gateway node transmits a notification to a user of the wireless sensing system that a malfunction has occurred. In some embodiments, the notification is, for example, a text message, an automated phone call or phone alert, or the like, and may comprise one or more of: information describing a portion of the vehicle experiencing the anomalous event (e.g., "rear left tire"), a type of anomalous event (e.g., "flat tire," "misaligned axle," etc.), an urgency of the anomalous event (e.g., whether urgent action is required), and one or more actions to be taken responsive to the anomalous event (e.g., "fill tires").

Figure 12:
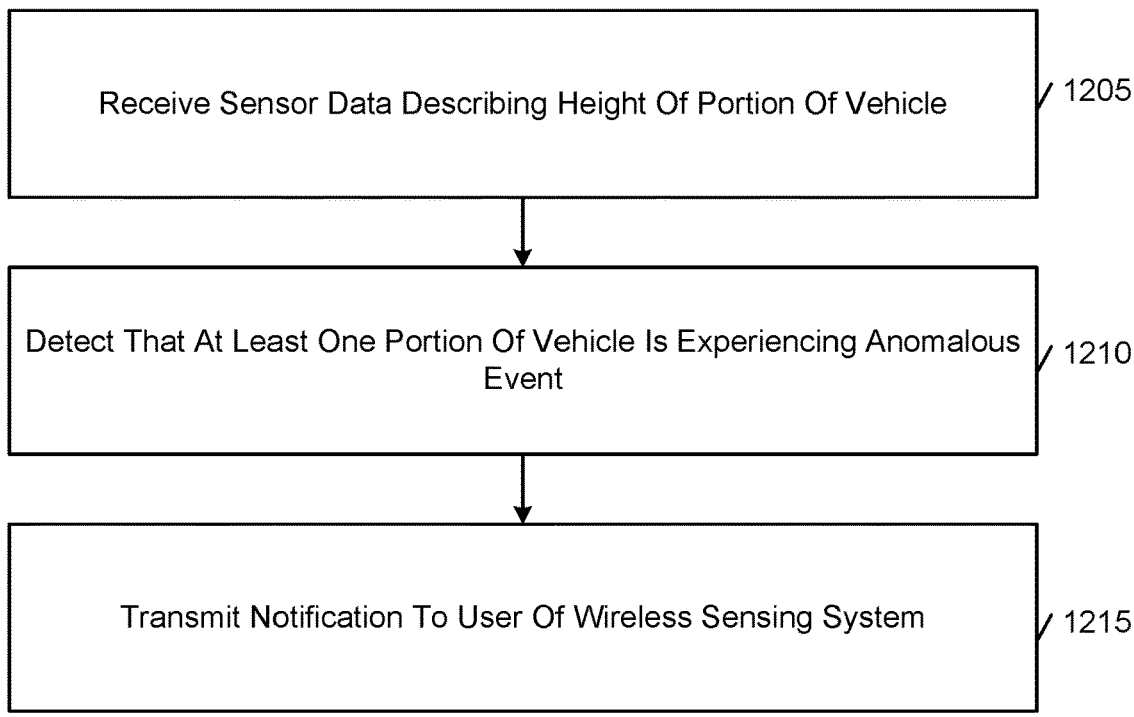
FIG. 12 is a flow diagram of a method for detecting anomalous events in vehicles, according to some embodiments.

FIG. 12 is a flow diagram of a method for detecting anomalous events in vehicles. A gateway node of a wireless sensing system receives 1205 sensor data describing heights of portions of a vehicle from a plurality of tape nodes. The plurality of tape nodes are adhered to respective portions of the vehicle and use sensors to capture data that directly or indirectly represents a current height of the respective portion of the vehicle. For example, the plurality of tape nodes are adhered at corners of the undercarriage of the vehicle, and may use one or more of a time-of-flight sensor, a light sensor, or an ultrasonic sensor to capture sensor data.

The gateway node detects 1210 that at least one portion of the vehicle is experiencing an anomalous event. Anomalous events may comprise one or more of: flat tires, low tire pressure, misaligned axles, punctured tires, and other mechanical failures impacting performance of the vehicle. The gateway node may detect anomalous events based, for example, on one or more sets of sensor data being above or below a threshold value of acceptable height, or based on one or more sets of sensor data being substantially different than one or more other sets of sensor data associated with the same vehicle. A substantial difference wherein a first portion of the vehicle is 3 inches in height higher above the road than a second portion of the vehicle may indicate that the second portion of the vehicle has a flat tire or low tire pressure. In other examples, other threshold differences may be used.

Responsive to detecting the anomalous event, the gateway node transmits 1215 a notification to a user of the wireless sensing system. The notification comprises, for example, information describing the anomalous event, such as an affected portion of the vehicle, a type of anomalous event, an urgency of the anomalous event, actions to be taken responsive to the anomalous event, and the like.

In the embodiment of FIG. 12, the steps described herein are performed by a gateway node of a wireless sensing system, e.g., a gateway node positioned in or on a vehicle. In other embodiments, the actions described herein may be performed by one or more other entities of the wireless sensing system. For example, the actions described herein may be performed by a master node of the plurality of nodes adhered to a vehicle, a mesh network of tape nodes, gateway nodes, client devices, and servers of the wireless sensing system, a cloud or server of the wireless sensing system, a client device receiving input from tape nodes of the wireless sensing system, or the like. In other embodiments, the method of FIG. 12 may include additional or different steps, or may be performed in another order.

Figure 13:
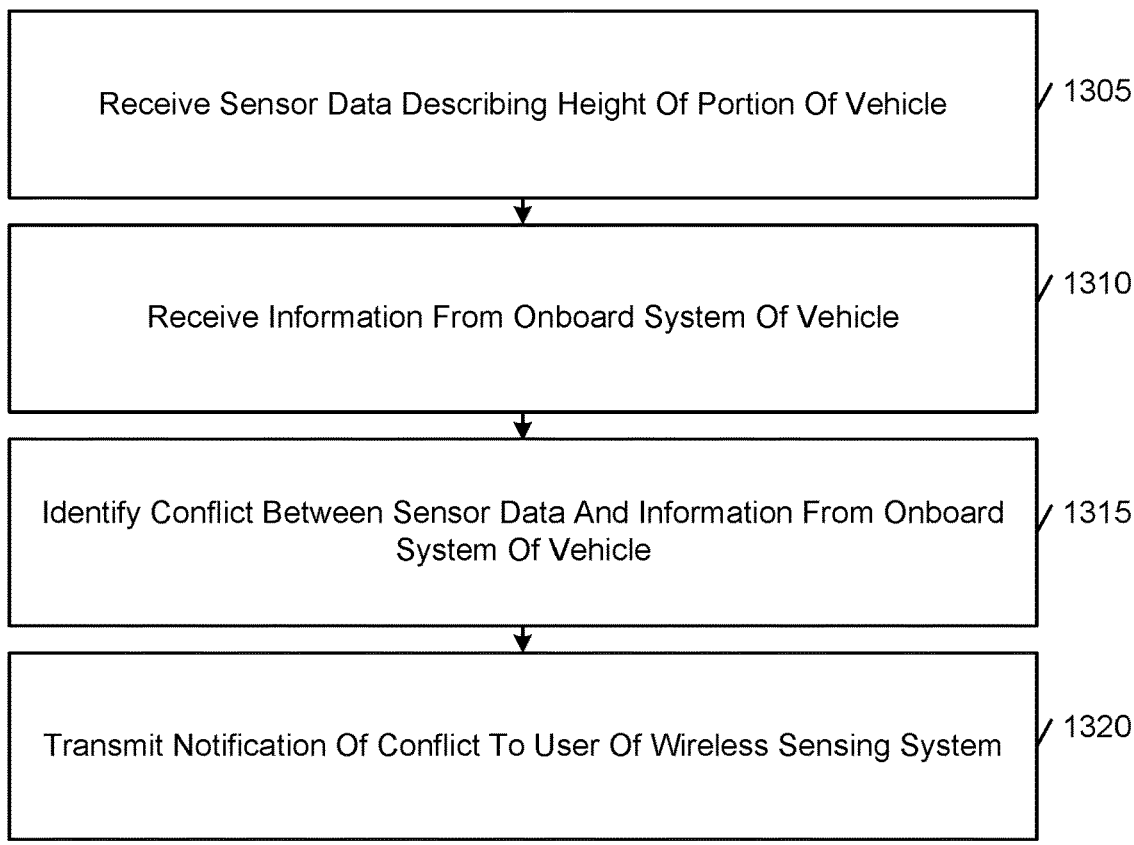
FIG. 13 is a flow diagram of a method for detecting anomalous events in vehicles based at least in part on onboard systems of vehicles, according to some embodiments.

FIG. 13 is a flow diagram of a method for detecting anomalous events in vehicles based at least in part on onboard systems of vehicles. A gateway node of a wireless sensing system receives 1305 sensor data describing heights of portions of a vehicle from a plurality of tape nodes. As previously described in conjunction with FIG. 12, the plurality of tape nodes are adhered to respective portions of the vehicle and use sensors to capture data that directly or indirectly represents a current height of the respective portion of the vehicle.

The gateway node of the wireless sensing system receives 1310 information from an onboard system of the vehicle. In an embodiment, the gateway node of the wireless sensing system may establish communications with one or more onboard systems of the vehicle using, for example, local communications systems such as Bluetooth. Onboard systems of the vehicle may comprise one or more of: tire pressure sensors, tire monitoring systems, accelerometers, speedometers, and the like.

The gateway node of the wireless sensing system performs one or more analyses on the sensor data from the plurality of tape nodes and the data from the onboard systems of the vehicle. During the analyses, the gateway node of the wireless sensing system 1315 identifies conflicts between sensor data from the plurality of tape nodes and data from onboard systems of the vehicle. When particular anomalous events occur, sensor data from the plurality of tape nodes and data from the onboard systems expect to capture particular trends or to capture corresponding sets of data. For example, if a vehicle experiences a flat tire, sensor data describing the portion of the vehicle having the flat tire is expected to reflect that the portion of the vehicle is closer to the ground or lower than other portions of the vehicle. During the flat tire event, a tire monitoring system or tire pressure system is expected to also capture data reflecting the flat tire, e.g., to show that tire pressure for the flat tire decreases quickly to below a threshold value. In some embodiments, the gateway node of the wireless sensing system uses the sensor data from the plurality of tape nodes and the data from the onboard systems to determine information about the anomalous event, such as a type of anomalous event, a severity or urgency of the anomalous event, and the like.

However, conflicts or discrepancies may occur between the sensor data from the plurality of tape nodes and data from onboard systems of the vehicle. For example, the gateway node may receive sensor data from the plurality of tape nodes corresponding to a flat tire, as described above, but may receive data from onboard systems of the vehicle indicating that tire pressure has been maintained at an acceptable level. The conflict between the sensor data from the plurality of tape nodes and data from onboard systems of the vehicle may represent a different kind of anomalous event, e.g., that an axle of the vehicle is misaligned or malfunctioning, that the vehicle is driving in a rut in the ground, or that another event has occurred.

Based on identified conflicts and on results from the analyses, the gateway node transmits 1320 notification to the user of the wireless sensing system. In an embodiment wherein a conflict occurs, the notification may comprise one or more of: information describing the conflict, possible causes of the conflict, information about the anomalous event, a severity or urgency of the anomalous event, a type of the anomalous event, actions to be taken responsive to the anomalous event, and the like.

In the embodiment of FIG. 13, the steps described herein are performed by a gateway node of a wireless sensing system. In other embodiments, the actions described herein may be performed by one or more other entities of the wireless sensing system. For example, the actions described herein may be performed by a master node of the plurality of nodes adhered to a vehicle, a mesh network of tape nodes of the wireless sensing system, a cloud or server of the wireless sensing system, a client device receiving input from tape nodes of the wireless sensing system, or the like. In other embodiments, the method of FIG. 13 may include additional or different steps, or may be performed in another order.

In some embodiments, time-of-flight sensors are used to determine a condition of one or more tires of a vehicle. Near every tire on a vehicle, a wireless sensing device with a time-of-flight sensor (or other distance sensor) that points towards the ground is installed. The time-of-flight sensor measures the distance from the portion of the vehicle its installed on to the ground. If the vehicle has one or more tires with lower than the manufacturer recommended tire pressure, that part of the car will be closer to the ground than if the tires had the manufacturer recommended tire pressure. The system detects the change in height using the time-of-flight sensor. In other embodiments, a different type of sensor, such as any distance/altitude sensor (light, ultrasonic) may be used instead of the time-of-flight sensor to capture the change in altitude or height of the portion of the vehicle.

In other embodiments, rather than pointing sensors towards the ground, there are other measurements that may be used based on where the tape node is adhered and how it is oriented to detect a change in the condition of a tire of a vehicle. In some embodiments, the system may measure a distance from a portion of a tire to a top portion of a wheel well of the vehicle that corresponds to the tire. For example, a tape node may be installed on a portion of the tire and another tape node may be installed on a the top portion of the wheel well. The distance between the two tape nodes may be measured based on received signal strength (e.g., RSSI) of wireless communications between the two tape nodes. The RSSI may be used to determine an average distance between the two tape nodes for a first period of time. If in another period of time the average distance between the two tape nodes is different than the average measured during the first period of time, it may indicate that a condition of the vehicle has changed. For example, the change in distance may be due to a change in the tire pressure, a change in the condition of the tire pressure tread (such as the thickness of the tread), a change in the wheel alignment of the vehicle, a change in the suspension of the vehicle, or some other change in the vehicle.

In some embodiments, a distance from a center of a vehicle's wheel (e.g., if sensing device is integrated into the wheel itself) to the ground or to the body of the vehicle is measured by one or more tape nodes to detect changes in the condition of the vehicle. Similar to the configuration described above, one wireless sensing device may be integrated into the wheel itself and measure the distance to a tape node installed on the body of the vehicle based on RSSI of wireless communications between the tape node and the wireless sensing device. The wireless sensing device may include an altitude sensor or may measure a change in capacitance resultant from a change in the distance of the wheel from the ground. If a change in the distance from the wheel to the ground or to the body of the vehicle is detected, the system may determine that a change in the condition of the vehicle has occurred.

In some embodiments, the wireless sensing device and the wireless sensing system 400 are integrated with an onboard vehicle system of a vehicle. The onboard vehicle system may include a onboard diagnostics (OBD) system, a computer system of the vehicle, or another system for diagnostics, reporting, and communication onboard the vehicle. For example, the wireless sensing device may be integrated with a tire-monitoring system of the vehicle or another monitoring system of the vehicle. The wireless sensing device may be used by to confirm or validate reports from the onboard vehicle system, and similarly the tracking system 400 may receive reports from the onboard vehicle system to determine if reports received on the condition of the vehicle from the wireless sensor device are accurate. Certain events follow expected patterns in the wireless sensing device's sensor data and the onboard vehicle system's diagnostic data. For example, the onboard vehicle system is able to detect a tire is low pressure which should correlate to a particular corresponding heatmap for a tire detected by the wireless sensing device. In another example, a low tire pressure warning may correspond to a time-of-flight sensor showing a low distance between a portion of the vehicle and the ground.

If conflicts occur between the wireless sensing device's sensor data and the onboard vehicle system's diagnostic data, mechanical failures or potential vehicle issues not initially detected or undetectable to the onboard vehicle system may be the cause of the detected event. For example, misalignment of tires on axles, uneven loading of cargo on vehicle, and the like may be detected by the wireless sensing device and system, but may not be easily detected by the onboard vehicle system. Additionally, conflicts in the data may be due to one of the sensors onboard the vehicle or part of the wireless sensing device experiencing an edge case causing a false alarm.

In some embodiments, the wireless sensing system 400 provides notifications to users alerting the users to detected changes in the condition of the vehicle. The notifications may be displayed to the user on a client device with an installed app that corresponds to the system 400. Additionally, the system 400 may provide instructions to users to fill tires, to realign tires, to rebalance cargo, load in vehicle, and/or perform other maintenance on the vehicle in response to a detected change in the condition of the vehicle. In one example, the wireless sensing device detects that one or more tires of a vehicle is experiencing high friction or wear and instructs one or more users to change or rotate one or more of the tires on the vehicle. The wireless sensing device may also notify the one or more users that one or more of the tires is likely to experience a flat tire or blowout.

According to some embodiments, tape nodes are adhered to a vehicle and capture sensor data on the vehicle. The tape nodes send sensor data to a gateway node positioned in and/or on the vehicle. The tape nodes may all send data individually (e.g., at scheduled times, at specified wavelengths or communications channels), in some embodiments. One of the tape nodes may be assigned a master node role that collects all sensor data from the other tape nodes and then transmits the collected sensor data as a single package to the gateway node. The gateway node analyzes the captured sensor data and determines if and when an anomalous event occurs that may correspond to a change in the condition of the vehicle. The gateway node wirelessly transmits notification to one or more of a client device of a user, an onboard vehicle system of the vehicle, another gateway node located external to the vehicle, another node of the wireless sensing system, and a server of the wireless sensing.

In further embodiments, the gateway node on or in the vehicle communicates with onboard systems of the vehicle to retrieve data and compares the onboard system data to data received from the tape nodes.

In some further embodiment, the gateway node on or in the vehicle communicates results of analyses and/or any detected anomalous events to a cloud or server of the wireless sensing system. The results and information describing the anomalous events may be stored or leveraged to provide further training and/or example data for future anomalous events.

In other embodiments, the gateway node on or in the vehicle compiles all received sensor data from tape nodes and sends the data to a cloud or server of the wireless sensing system 400. The analysis of the data is then performed on the cloud or server of the wireless sensing system 400. This may be beneficial if, for example, gateway node does not have computing power, battery life, etc. necessary to perform analyses. Analyses and/or computation is performed by the cloud or server of the wireless sensing system. If anomalous event is detected, cloud or server of wireless sensing system transmits notifications to users.

In some embodiments, computation and communications for performing analyses is distributed between gateway node and cloud or server of wireless sensing system.

For example, a first portion of analysis may be performed locally by the gateway node on or in the vehicle and the remaining analyses is performed by the cloud or server(s) of the wireless sensing system 400.

Monitoring Vehicles for Patterns of Wear Using Heatmaps

A wireless sensing system uses surface temperature of tires as a proxy for wear on the tire. While tires unavoidably experience wear over the course of a lifetime on a vehicle, standard patterns of wear, e.g., as experienced by tires aligned and filled correctly, impact performance and chance of catastrophic failure less than abnormal patterns of wear, e.g., as experienced by tires misaligned on the axle, over- or underinflated, or experiencing high cargo weight during journeys. The wireless sensing system comprises a plurality of wireless sensing devices, such as tape nodes, having sensors or cameras configured to capture surface temperature of tires of vehicles. Each wireless sensing device is an electronic sensor device that includes at least one sensor for measuring a physical property in an environment of the electronic sensor device. Each wireless sensing device also includes at least one wireless communication system for performing wireless communication with one or more nodes of the wireless sensing system 400. The wireless sensing devices generate heatmaps of tires based on the captured surface temperature and determine, based on the generate heatmaps, whether a tire is experiencing abnormal wear, anomalous events, or the like.

Figure 14A:
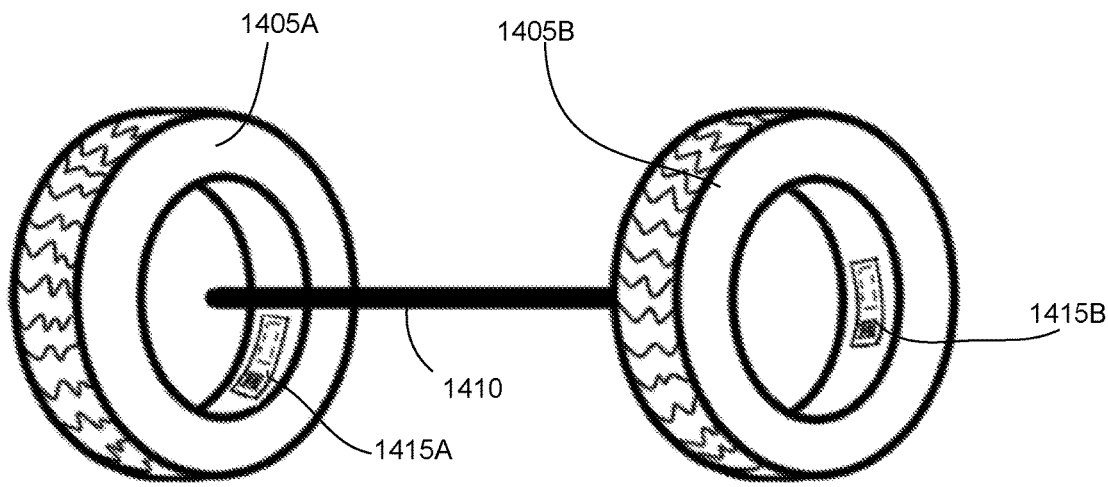
FIGS. 14A-14E are diagrammatic views illustrating tires of vehicles monitored using tape nodes and corresponding heatmaps, according to some embodiments.

FIGS. 14A-14E are diagrammatic views illustrating tires of vehicles monitored using tape nodes and corresponding heatmaps. FIG. 14A is a diagrammatic view illustrating a set of tires 1405A, 1405B on an axle 1410 of a vehicle. Each tire 1405A, 1405B is associated with a wireless sensing device 1415A, 1415B, such as a tape node. Although other components of the vehicle are not depicted in FIG. 14A, in some embodiments the vehicle comprises one or more additional sets of tires 1405 connected by a respective axle and each having a respective wireless sensing device. The wireless sensing devices comprise one or more sensors or cameras configured to capture heat profiles of the tires. In the embodiment of FIG. 14A, the wireless sensing devices 1415 are adhered or affixed to an interior rim of a wheel associated with one of the respective tires 1405. In some examples, the wireless sensing devices 1415 are adhered to a surface of the interior of a rim and one or more components of the sensing devices are placed inside a respective tire 1405 via a hole drilled in the metal rim of the wheel. In other embodiments, the wireless sensing devices 1415 may instead of be adhered or affixed to a body or wheel well of the vehicle. The wireless sensing devices 1415 may be oriented such that one or more sensors or cameras are able to capture a profile of the respective tire 1405 as it rotates, e.g., is adhered to a bottom of the wheel well of the vehicle and is oriented downward to the respective tire 1405. In some embodiments, the wireless sensing device 1415 is placed on the interior of the tire 1405A or 14065B or a component of the tire 1405A or 1605B itself. In other embodiments, the wireless sensing device 1415 is integrated with a component of the tire 1405A or 14015B on the interior of the tire. For example, the wireless sensing device 1415 may be integrated or positioned on an interior part of the tire casing, on a portion near the bead, a portion corresponding to the belt, on the interior of the side wall, on another component of the tire, or some combination thereof.

Figure 14B:
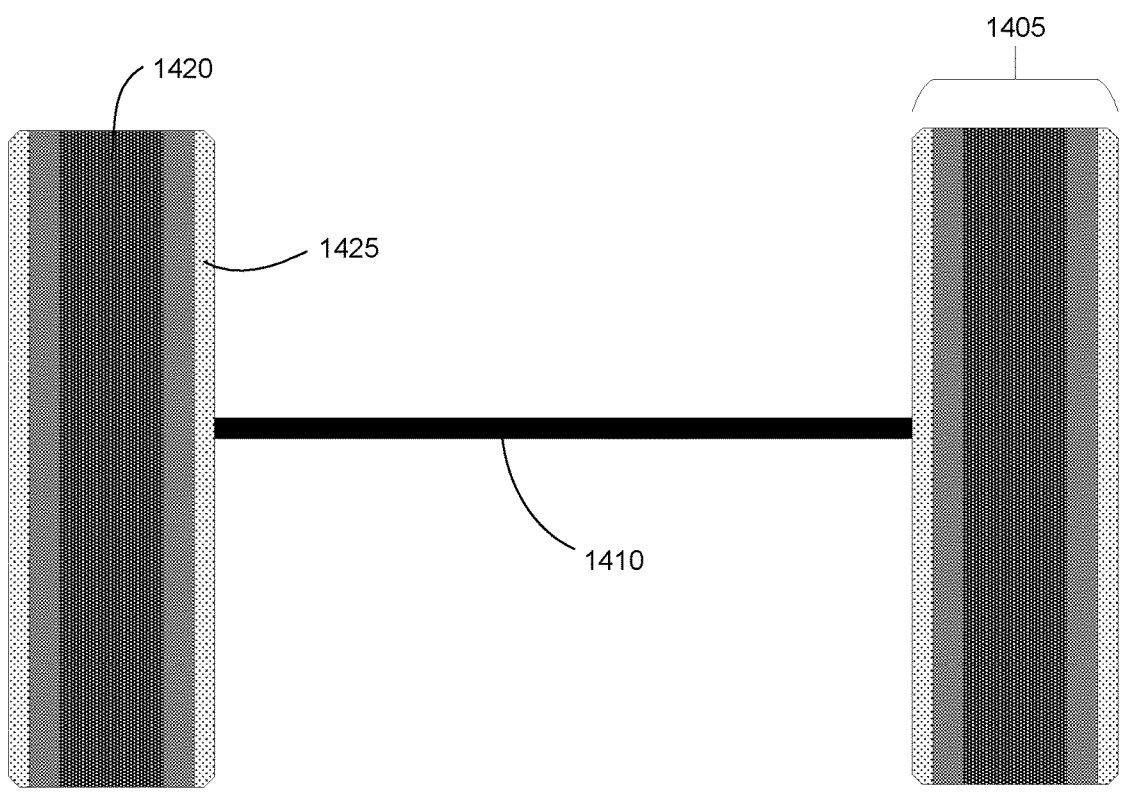

FIG. 14B is an illustration of a heat map illustrating normal wear of a tire 1405. In the embodiment of FIG. 14B, a center portion 1420 of each tire experiences a greatest amount of friction and heat, while the outside portions 1425 of each tire experience less friction and heat. In some embodiments, a heat map having this pattern may be considered a part of normal wear experienced over the lifetime of a tire. In other embodiments, a heat map having this pattern may be considered abnormal or an anomalous event if a magnitude of heat in any portion of the tire 1405 exceeds a threshold value. For example, if a magnitude of heat in the center portion 1420 of each tire exceeds a threshold value, the wireless sensing device may identify one or more tires as being overinflated. In another example, if a magnitude of heat in the center portion 1420 and the outside portions 1425 of each tire exceed respective threshold values, the wireless sensing device may identify the vehicle as being under a high load, e.g., cargo weight causing high pressure to the tires.

Based on the determined heat map, the wireless sensing system determines the amount of wear on a tire. If the amount of wear on the tire is above a threshold amount, the wireless sensing system transmits an alert to a user of the system. For example, the threshold may correspond to a condition where the risk of a flat tire, a broken tire, or some other tire malfunction is high. Thus, using the wireless sensing system with the wireless sensing device, the user may be notified of a tire that needs to be replaced or serviced.

Figure 14C:
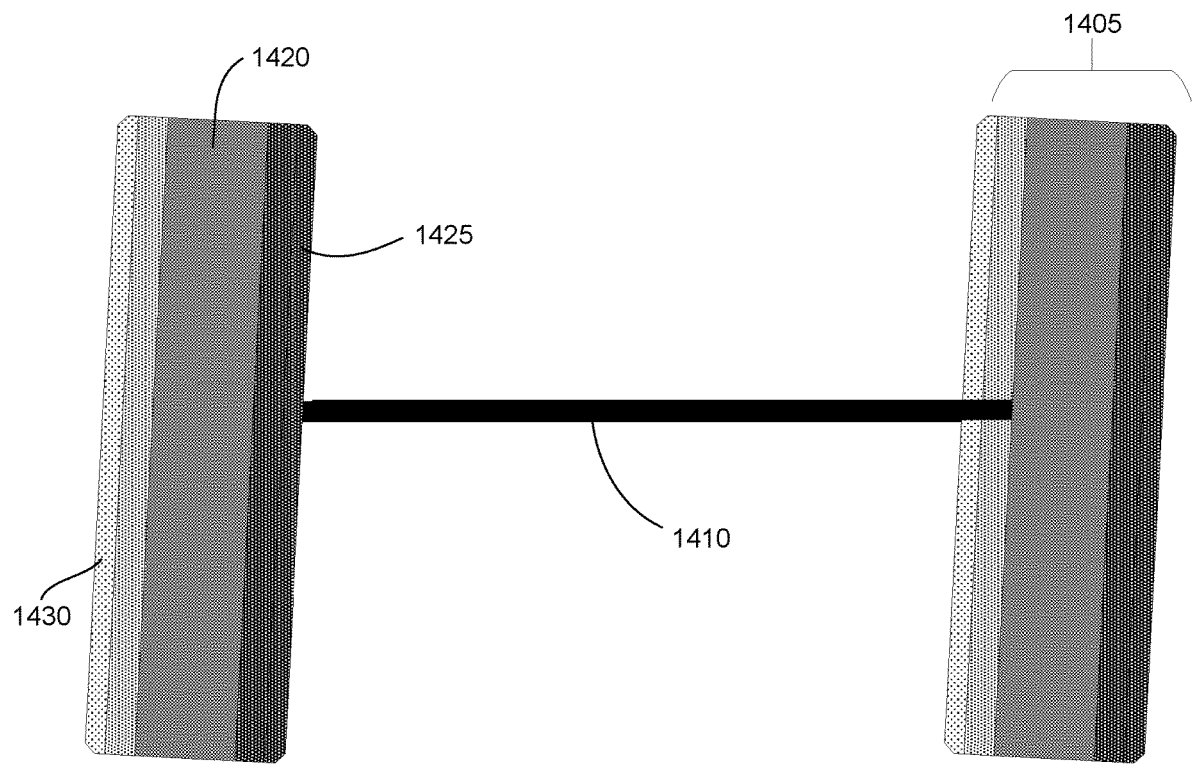

FIG. 14C is an illustration of a heat map correlating to an anomalous event causing irregular wear on a tire 1405. In the embodiment of FIG. 14C, a first side 1425 of each tire experiences a greatest amount of friction and heat, while a second side 1430 of each tire experiences less friction and heat. In some embodiments, wireless sensing devices capturing heat profiles having this pattern may identify anomalous events such as, for example, misalignment of tires on the axle 1410, as illustrated in FIG. 14C. In other embodiments, wireless sensing devices capturing heat profiles having this pattern may identify other anomalous events such as, for example, uneven loading of cargo in the vehicle.

Figure 14D:
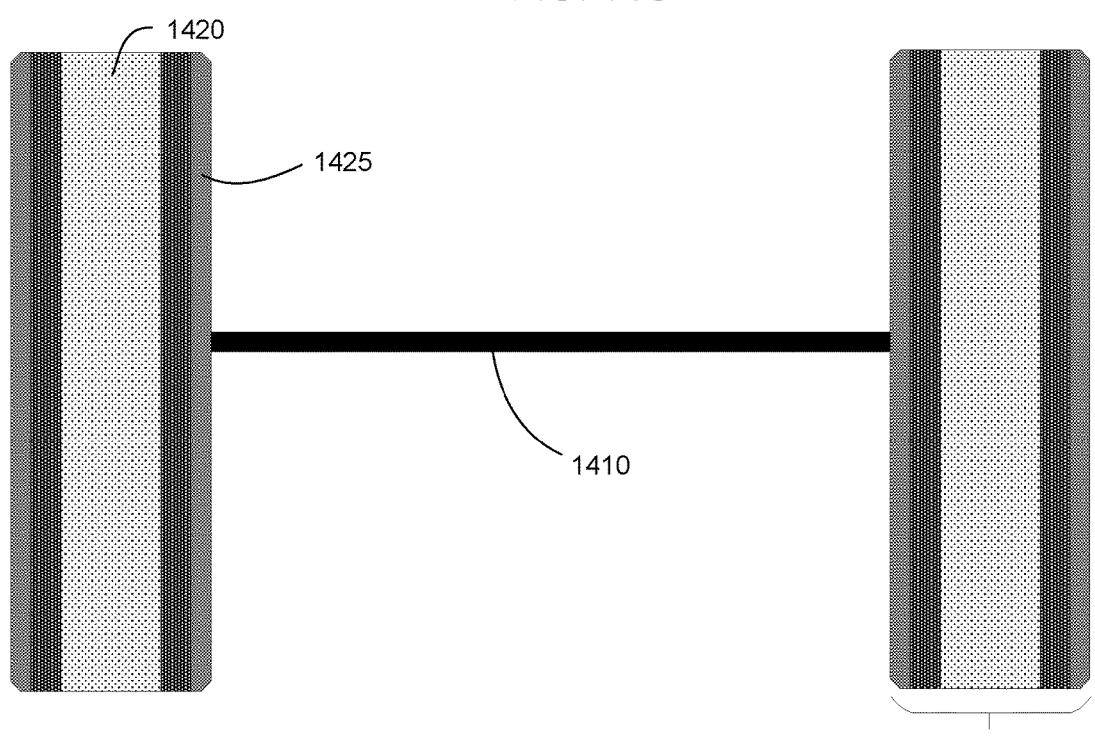

FIG. 14D is an illustration of a heat map correlating to an anomalous event causing irregular wear on a tire 1405. In the embodiment of FIG. 14D, the outside portions 1425 of each tire 1405 experience greater heat than a respective center portion 1420 of the tire. In some embodiments, wireless sensing devices capturing heat profiles having this profile may identify anomalous events such as, for example, underinflation of the tires 1405.

Figure 14E:
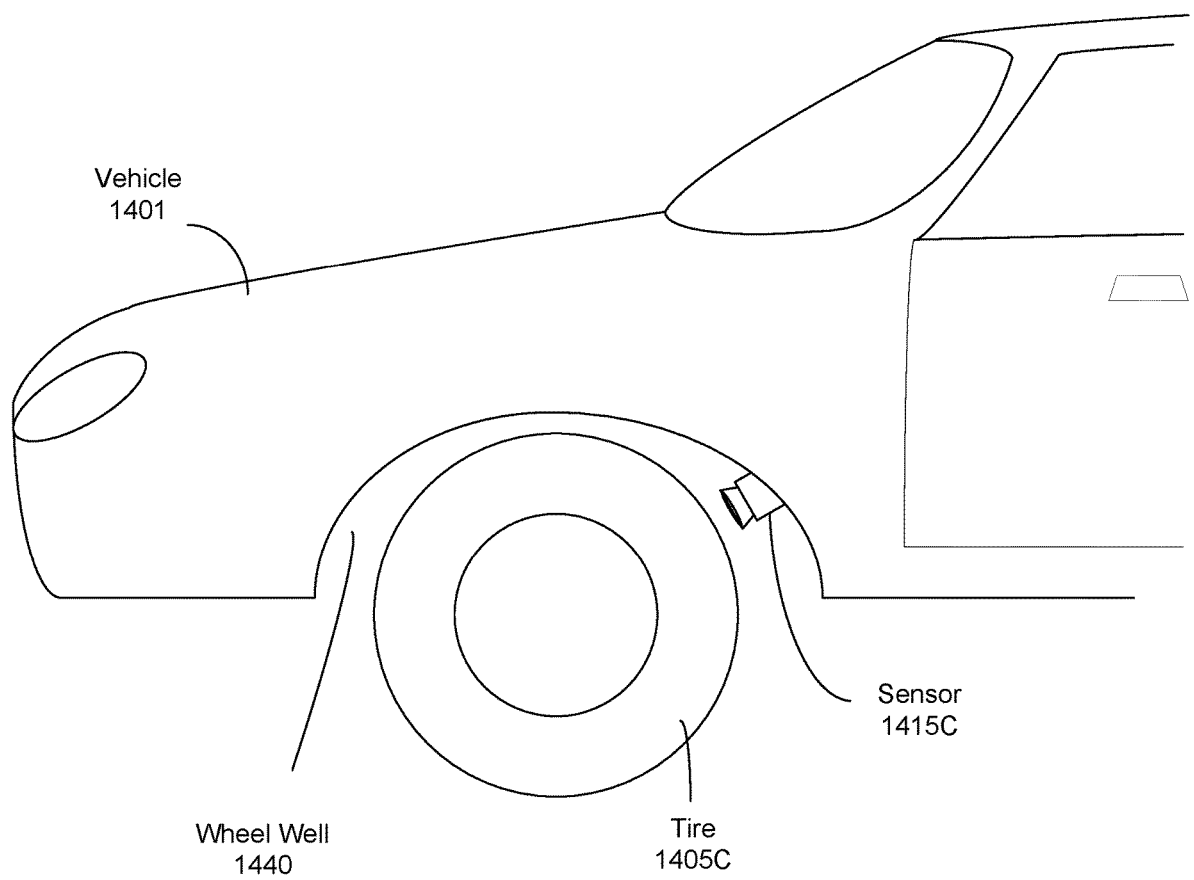

FIG. 14E is a diagram showing a placement of a wireless sensor device 1415C attached to a portion of a vehicle 1401 external to a tire 1405C for monitoring the condition of the tire 1405C, according to some embodiments. In the example of FIG. 14E, the wireless sensor device 1415C is shown as a camera, imaging device, or thermal imaging device (e.g., an infrared camera), but in other embodiments, the wireless sensor device 1415C may be a different type of device. For example, the wireless sensor device 1415C may be an embodiment of an adhesive tape platform, as discussed above with respect to FIGS. 1-6C. In a further embodiment, the wireless sensor device 1415C is an embodiment of an adhesive tape platform with a camera (optical or infrared) integrated in the adhesive tape platform.

The wireless sensor device 1415C is positioned external to the tire 1405C and oriented to capture sensor data on the tire tread of the tire 1405C. In the case where the wireless sensor device 1415C includes a camera, the camera is positioned and oriented to capture images of the tire's tread. In some further embodiments, the wireless sensor device 1415C may additionally include a light to illuminate the tire 1405C for improving the quality of images captured by the camera.

The wireless sensor device 1415C may determine a condition of the tread of tire 1415C based on images or videos captured of the tread. The images or videos may be thermal images or videos (if the wireless sensor device 1415C is a thermal imaging camera). The wireless sensor device 1415C may generate a heat map such as those discussed above with respect to FIGS. 14B-14D based on the thermal images or videos captured by the wireless sensor device 1415C.

In other embodiments, different patterns may appear in heatmaps captured by wireless sensing devices. In other embodiments, wireless sensing devices may identify other causes, wear, or anomalous events correlating to particular patterns in heatmaps. For example, wear in tires may be caused by one or more of: over or under inflation of tires, misalignment of tires, uneven distribution of cargo or other weight, exceeding a threshold amount of cargo or other weight, irregularities in terrain, road conditions, and weather, type of tires, driver habits, and the like.

Figure 15:
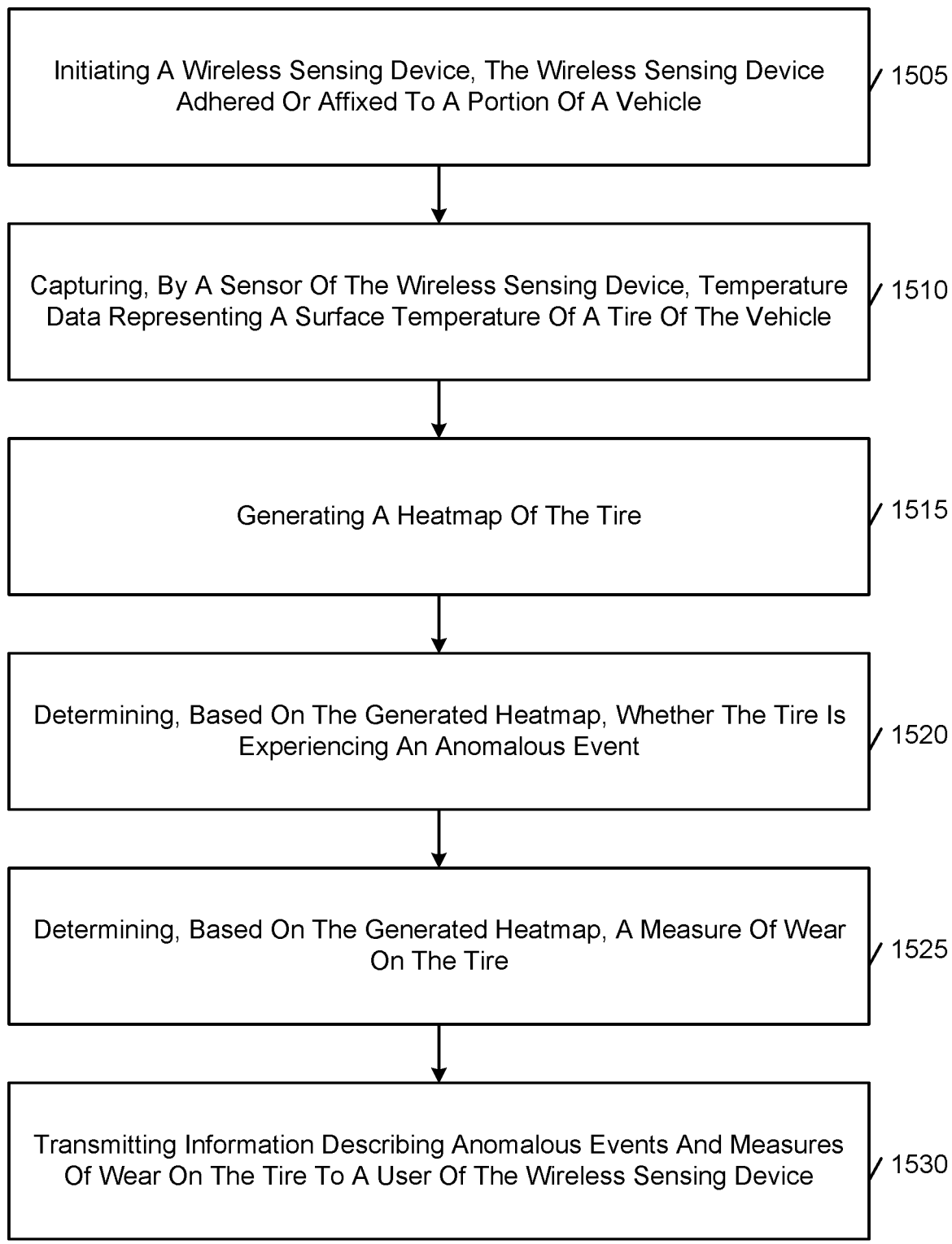
FIG. 15 is a flow diagram of a method for detecting anomalous events and wear on tires of vehicles using tape nodes, according to some embodiments.

FIG. 15 is a flow diagram of a method for detecting anomalous events and wear on tires of vehicles using tape nodes. A wireless sensing device is initiated 1505 for operation. The wireless sensing device is, for example, a tape node or other adhesive tape product, a smart wheel, or another form factor capable of being adhered or affixed to a portion of a vehicle and capturing data associated with at least one tire of the vehicle. In some embodiments, the wireless sensing device comprises an infrared camera. In other embodiments, the wireless sensing device comprises temperature probes or sensors, or other types of cameras or sensors configured to capture data describing surface temperature of a respective tire. In other embodiments, the wireless sensing device comprises a pressure sensor, wherein pressure is used as a proxy for wear on the tire.

The sensor of the wireless sensing device captures 1510 temperature data representing a surface temperature of a tire of the vehicle. The wireless sensing device generates 1515 a heatmap of the tire corresponding to the captured temperature data. In some embodiments, the wireless sensing device transmits the heatmap to a master node or to a gateway node associated with the vehicle, such that heatmaps corresponding to each tire of the vehicle may be directly compared. In other embodiments, the wireless sensing device analyzes each generated heatmap independently.

The wireless sensing device determines 1520 whether the tire is experiencing an anomalous event based on the heatmap. Anomalous events may be, for example, underinflated or flat tires, blowouts, or other events that may require users of the wireless sensing device or drivers of the vehicle to take one or more actions to correct the event. The wireless sensing device further determines 1525 a measure of wear on the tire. In some embodiments, the wireless sensing device makes these determinations by comparing the generated heatmap of the tire to historic heatmaps stored by a wireless sensing system. For example, a wireless sensing system may store heatmaps corresponding to a plurality of vehicles, tires, and journeys experiencing a plurality of conditions of wear and anomalous events. In some embodiments, the wireless sensing device makes these determinations at least in part by comparing the generated heatmap of the tire to a baseline heatmap of the tire at an earlier time (e.g., a first set of 100, 1000, etc. heatmaps generated upon installation of the tire to the vehicle or upon installation of the wireless sensing device to the vehicle). The wireless sensing device may apply one or more filters to remove information entropy and noise from the heatmaps and to identify patterns in distribution of heat in the tire.

In some embodiments, the wireless sensing device makes these determinations at least in part by applying a machine learning model to the generated heatmap. The machine learning model may be trained on, for example, heatmaps of new tires without wear, heatmaps of tires having experienced standard wear at various stages, heatmaps of tires having experienced anomalous events such as flat or underinflated tires, overinflated tires, blowouts, and the like, and other conditions impacting the lifespan and performance of the tires. In some embodiments, the machine learning model is a classifier or another type of model.

The wireless sensing device transmits 1530 information describing any identified anomalous events and measures of wear on the tire to a user of the wireless sensing device or a driver of the vehicle. In some embodiments, the wireless sensing device additionally transmits one or more actions to be taken, e.g., refilling tires, rotating tires, realigning tires, adjusting distribution of cargo in the vehicle, and the like.

FIG. 16A is a diagrammatic view illustrating a set of tires 1605A, 1605B on an axle 1610 of a vehicle. Each tire 1605A, 1605B is associated with a wireless sensing device 1615A, 1615B. In some embodiments, each of the wireless sensing devices is a tape node. Although FIGS. 14A and 16A show tape nodes, other wireless sensing devices with different form factors (e.g., rigid form factor, smart label, rigid thin label, etc.) may be used, according to other embodiments. Although other components of the vehicle are not depicted in FIG. 16A, in some embodiments the vehicle comprises one or more additional sets of tires 1605 connected by a respective axle and each having a respective wireless sensing device. The wireless sensing devices 1615 comprise one or more sensors or cameras configured to capture heat profiles of the tires. In the embodiment of FIG. 16A, one or more of the wireless sensing devices 1615 are adhered or affixed to an interior rim of a wheel associated with one of the respective tires 1605. In some examples, the wireless sensing devices 1615 are adhered to an interior surface of a rim and one or more components of the sensing devices are placed inside the respective tire 1605 via a hole drilled in the respective rim of the vehicle's wheel. In other embodiments, the wireless sensing devices 1615 may instead be adhered or affixed to a body or wheel well of the vehicle. The wireless sensing devices 1615 may be oriented such that one or more sensors or cameras are able to capture a profile of the respective tire 1605 as it rotates, e.g., is adhered to a bottom of the wheel well of the vehicle and is oriented downward to the respective tire 1605. In some embodiments, the wireless sensing device 1615 is placed on the interior of the tire 1605A or 16065B or a component of the tire 1605A or 1605B itself. In other embodiments, the wireless sensing device is integrated with a component of the tire on the interior of the tire. For example, the wireless sensing device 1615 may be integrated or positioned on an interior part of the tire casing, on a portion near the bead, a portion corresponding to the belt, on the interior of the side wall, on another component of the tire, or some combination thereof.

The wireless sensing devices 1615 are configured to measure a distance from the sensing device to an outer wall of the tire. FIG. 16B shows a cross-section of tire 1605A, when the tire 1605A has tire pressure corresponding to a recommended tire pressure for the tire 1605A. The recommended tire pressure may be a tire pressure that is suggested by the manufacturer. The wireless sensing device 1615A is located at the position 1620 and measures the distance T1 from the position 1620 to the outer wall of the tire 1605A.

FIG. 16B shows a cross-section of the tire 1605A, when the tire 1605A has a tire pressure lower than the recommended tire pressure. In this case, because the tire pressure is lower than the recommended tire pressure, the combined weight of the vehicle and the lower tire pressure causes the distance T2 from the position 1620 of the wireless sensing device 1615A to the outer wall of the tire to be less than the distance T1 when the tire 1605A is at the recommended tire pressure. The wireless sensing device 1605A is configured to determine changes in the tire pressure based on distance measurements made by the wireless sensing device 1605A. The wireless sensing system 400 can track the condition of the tire 1605A by identifying trends in the determined tire pressure. For example, the wireless sensing system 400 may determine that the condition of the tire 1605A is below a threshold level based on the frequency with which the determined tire pressure for the tire 1605A drops below the recommended tire pressure. In some embodiments, the wireless sensing system 400 may determine that the condition of the tire has changed based on a change in the determined tire pressure for the tire 1605A. For example, if the tire pressure for the tire 1605A changes significantly (e.g., above a threshold amount of pressure) in a short period of time (e.g., less than a threshold amount of time), the wireless sensing system 400 may determine that the tire has gone flat or has been punctured.

In some embodiments, the wireless sensing device makes these determinations at least in part by applying a machine learning model to the generated heatmap. The machine learning model may be trained on, for example, determined tire pressure data of new tires without wear, determined tire pressure data of tires having experienced standard wear at various stages, determined tire pressure data of tires having experienced anomalous events such as flat or underinflated tires, overinflated tires, blowouts, and the like, and other conditions impacting the lifespan and performance of the tires. In some embodiments, the machine learning model is a classifier or another type of model.

In some embodiments, the wireless sensing devices used to monitor the conditions of a tire are include one or more temperature sensors, heat sensors, thermal imaging cameras, infrared cameras, or other sensors. A wireless sensing device with one or more of an infrared (IR) camera, an infrared light sensor, or a temperature sensor is adhered to a portion of a vehicle (or other object with tires) such that the sensor captures data about the surface temperature of the tire, as discussed above with respect to FIGS. 14A-14E. The one or more cameras and/or sensors capture sensor data that is used by the wireless sensing system 400 to generate a heat profile of a tire. The wireless sensing system 400 in some produces a heatmap reflecting areas of the tire experiencing heat due to, for example, friction from the road. Based on the heatmap or temperature profile of the tires, the wireless sensing system 400 assesses condition of tires. In some embodiments, the heatmap is generated locally by the wireless sensing device. In other embodiments, the sensor data from the wireless sensing device is transmitted to another wireless node of the wireless sensing system 400, such as a gateway node, and the other wireless node analyzes the data and generates the heat map. In some other embodiments, the sensor data from the wireless sensing device is received by the cloud or server(s) of the wireless sensing system 400 and the heatmap is generated in the cloud or by the server(s).

Higher temperatures in portions of the tire may correlate to greater wear and tear experienced in the respective portions. This may be due to greater friction wearing away material of the tire. Particular temperature profiles may correlate to anomalous events, such as misalignment of tires on axle, uneven loading of vehicle, or other events.

In some embodiments, the system may determine a relative thickness of a tread or a thickness of the tire at a location on the tire based on the heatmap generated by the wireless sensing system400. Based on the heatmap, an estimate for the amount of material (i.e. rubber) left at the location of the tire is determined. This may be determined based on the fact that thinner portions of the tire heat up faster while the vehicle is being driven.

In some embodiments, the wireless sensing system predicts the likelihood of a tire blowout and flat tire event based on portions of tire experiencing greater heat or friction than is expected. For example, the wireless sensing system may determine baseline heatmaps for tires that are operating under normal conditions. Deviations from the baseline heatmaps may correspond to anomalous events and may be detected by the wireless sensing system as indicating a possible blowout or flat tire. In some embodiments, the heat maps are input to a trained machine learning model that generates predictions on the condition of the tire based on the heat maps. The machine learning model may be trained on data from tires in various conditions and states.

In some embodiments, a wireless sensing device with an IR camera and/o temperature sensor is integrated as part of a smart wheel of a vehicle. Examples of placement or deployment of the wireless sensing device with the IR camera or temperature sensor include being integrated into or attached to the metal rim of a wheel, being integrated into or attached on the rubber of the tire, and other positions on the vehicle. In some embodiments, the wireless sensing device is integrated into or adhered to a metal rim, and one or more sensors and/or cameras of the sensing device are placed in a hole drilled in the rim, with the cameras and/or sensors oriented to towards the interior of the tire, such that the cameras or sensors capture data on the interior surface of the tire. This allows the structure of the wheel itself to protect the IR cameras/sensors and to ensure that camera lenses don't become dirty over time. Additionally, this allows for other sensors on the wireless sensing device to capture data describing tire conditions, such as, vibration, air pressure, light exposure, and other sensor readings.

In other embodiments, the wireless sensing device is retroactively fitted on a vehicle, e.g., adhered to the wheel well or to the body of the vehicle such that the IR camera and/or temperature sensor points downward towards a tire and captures a thermal profile of the tire as it rotates.

In some embodiments, the wireless sensing device detects an RPM of the tire so as to correctly produce a heatmap representing a full map of the wheel during a rotation. In other embodiments, other proxies for temperature or heatmaps may be used, e.g., air pressure, force, vibration, etc.

In some embodiments, wireless sensing device determines when vehicle is in motion, when vehicle has ended a journey and/or stopped temporarily (e.g., at a stoplight), and when vehicle is off.

The wireless sensing system may communicate with onboard systems of vehicle.

The wireless sensing device may include an accelerometer and/or velocity sensor.

IR camera, temperature sensors, time-of-flight sensors may capture blurry data if vehicle is moving too quickly. In some embodiments, sensors capture data at all times when wireless sensing device is in standard operation mode and discard blurry data. In some embodiments, sensors initiate data capture responsive to vehicle moving at less than a threshold speed (e.g., 30 mph). In some embodiments, sensors initiate data capture responsive to vehicle ending a journey/being at a full stop and perform analysis on residual heat, resting time-of-flight data, etc.

In some embodiments, wireless sensing device determines when a new tire is installed to the vehicle, e.g., based on user input, based on captured sensor data (distance between body of vehicle and ground increasing more than a threshold amount from a previous measurement, lack of wear on treads of tire determined by imaging, temperature sensors, or IR sensors, etc.). Data captured describing the new tire is stored by the wireless sensing device as a baseline. Baseline data is used by sensing device to determine change over time or during motion of vehicle. In some embodiments, a baseline is generated for each tire of the vehicle In some embodiments, the wireless sensing system 400 measures gradation of a current heatmap's deviation from a baseline heatmap for the tire.

IR cameras in the wireless sensing device may be associated with a number of pixels captured per image. Threshold minimum number of pixels are required to accurately determine change over time vs. noise/information entropy. In an embodiment, noise/entropy are removed by applying a cut-off filter to the raw image data/generating a bitmap of the image data The system may determine a number of pixels that are different from the baseline image and determine if the tire has a condition that is below an acceptable threshold, based on the number of pixels that are determined.

Other sensors/equipment may be associated with different number of pixels and/or different pixel thresholds, e.g., threshold number of pixels required for accurate analysis may vary for each of: Cameras, 3D cameras, Stereoscopic camera, Time-of-flight sensors, 3D mapping cameras or sensors, ultrasonic sensors or other sensors.

Based on the deviation between a current heatmap of a tire and the baseline of the same tire, sensing device determines how a tire is experiencing wear and the overall condition of tire Patterns of wear can correlate to different causes, events, and actions that should be taken by a driver of the vehicle. For example, a standard pattern of wear may be unavoidable over the lifetime of a tire, but irregular patterns of wear may be preventable, e.g., if a vehicle is overloaded (causing wear to occur at a greater rate than normal), loaded lopsidedly; if tires on vehicle are misaligned, overinflated, or underinflated, and the like.

Portions of the tire may be identified or segmented based on visible features, such as the tire's tread pattern In some embodiments, heatmaps are additionally compared to historical data, e.g., other vehicle wear patterns from a fleet of vehicles or from a database comprising heatmaps correlating to different events or causes.

The system 400 may access historical data having similarities to current vehicle or tire, e.g., such that heatmaps of tires of small personal vehicles are compared only to historic heatmaps of tires of small personal vehicles, as weight, maneuverability, and other specifics of vehicle may impact wear Similarly, different brands or types of wheels may experience wear differently. The system may identify trends in the wear and tear of the different brands or types of wheels and report the trends to one or more users.

Essentially, sensing device cross-references heatmaps captured by IR camera across all tires of the system so that causation of particular wear patterns can be accurately determined.

While differences in road, distance traveled, etc. may cause differences to occur in heatmaps (e.g., more heat may be generated for longer journeys than in shorter journeys, or wear may be caused irregularly in uneven roads), it is expected that these differences average out across the sample size If a particular tire is an outlier, there may be a mechanical issue with the wheel or the axle of the wheel. It is important for the sensing device to detect and notify a user/driver of the vehicle. In some embodiments, sensing device analyzes an instantaneous temperature profile/heatmap of the tire The system may identify portions of tire that overheat more than others The system may identify trends over time, e.g., if an area of tire is heating up on every journey In some embodiments, sensing device performs a continuous analysis, e.g., of a heatmap as it changes during a journey.

In some embodiments, sensing device additionally receives input describing the tire, such as brand, design, aspect ratio, tread, and other properties of the tire.

System may determine trends across different brands and other properties and provide recommendations—e.g., if a particular brand of tire consistently experiences less wear across all captured data, it may be beneficial for new tires to be purchased from the particular brand.

In some embodiments, the wireless sensing system 400 applies a machine learning model (e.g., classifier, neural network, or other type of machine learning model) to determine causes of regular and irregular wear on times and/or anomalous events impacting tires. Machine learning model is trained using examples of tires having no wear and examples of tires having experienced wear.

In some embodiments, examples of tires having no wear are new. In some embodiments, examples of tires having experienced wear are associated with historic information describing journeys, load, events such as flat tires or blowouts, and the like that may have caused the wear The machine learning model is trained to receive as input a heatmap or temperature profile of a tire and to output information about wear of the tire.

In an embodiment, the trained machine learning model outputs a value representing a degree of wear on the tire (for example, such that a higher value represents a need to correct load, alignment, other factors, or such that a value above a threshold value represents a need to replace the tire).

In some embodiments, output is associated with one or more actions to be taken by a user/driver of the vehicle, e.g., to refill tires, to replace tires, etc. The system may instruct the user via a user client device associated with the system 400, in response to detecting an event.

In an embodiment, model outputs an image representation of the tire comprising one or more areas of the tire experiencing a greatest amount of wear or more than a threshold amount of wear.

Computer Apparatus

Figure 17:
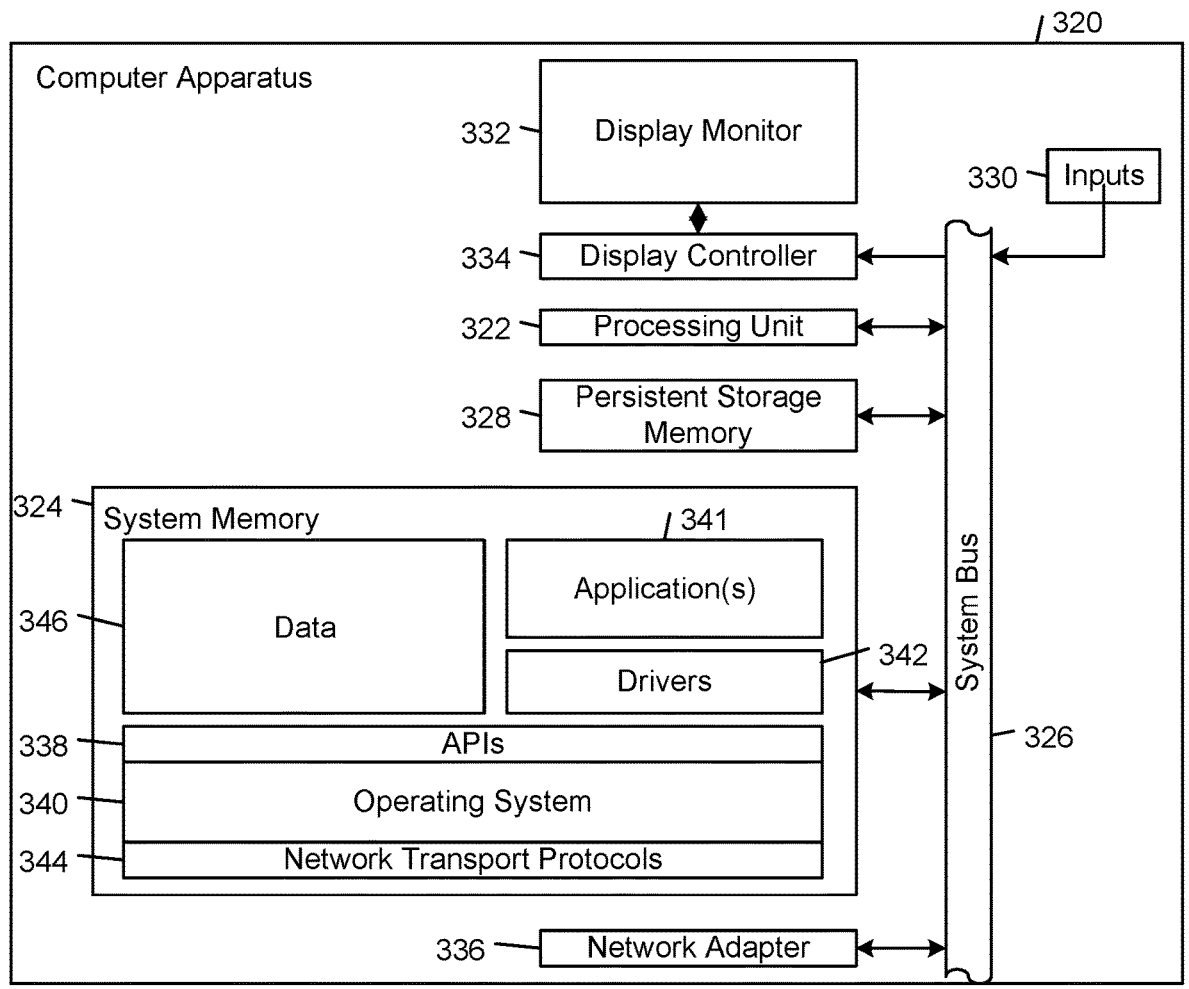
FIG. 17 shows an example embodiment of computer apparatus, according to some embodiments.

FIG. 17 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Embodiments

Look for edge cases, where tire is not flat, but the altitude is lower—may be caused by, for example, high cargo weight IR camera on tracking device of a vehicle (or other object with tires). IR camera is pointed at tires and measures the temperature profile of the tires. IR camera may be positioned from outside of the tire looking at the tire or positioned inside on the rib.

Put a temperature sensor on the wheel rim or tire and measure the surface temperature of the tire. Keep sending the temperature profile to a monitoring system. The monitoring system may be an onboard vehicle system or a node of the wireless sensing system 400.

Analyze the temperature profile of the surface of the tire tread or interior surface of the tire to determine the condition of the tire. Wear and tear may correlate to higher temperature. Can have any correlation between tire condition and temperature profile that we capture while doing analysis of the tire. System can learn the correlations and predict future occurrences of events based on training data.

Identify any change in the tire's composition and/or structure based on changes in temperature profile. For example, a tearing event, where a portion of the tire is torn, will include frictional heat that is captured by the temperature sensor or camera during the occurrence of the event.

In some embodiments, the system analyzes historical data of the tires heat profile. If one area of the tire is heating up on every drive differently from other portions of the tire, the system may predict wear and tear in that portion of the tire.

In some embodiments, the system may analyze snap shot of the tire's temperature profile. See instantaneous temperature profile of the tire based on sensor data. Detect that one part that gets hotter than the rest, identify that part as being worn.

In another embodiment, the system captures data when the car is not moving or is moving. When the car is moving, the system receives the RPM of the car from the vehicle's onboard vehicle system (e.g., computer or diagnostic system). The camera or sensor is configured to use a line or strip of pixels that is across the width of the tire and capture video at a framerate corresponding to the RPM of the car to determine a full profile of the surface of the tire's tread or the interior surface of the tire.

In other embodiments, the system captures a full 2D image (a strip/square of the tire) of the tire's surface. While the car is adjust the framerate of the camera based on the RPM of the vehicle's wheels to generate a 2D map of the temperature profile.

In some embodiments, the wireless sensing device is part of a smart wheel or rim. The wireless sensing device is integrated sensor into a wheel or rim of a wheel. The sensor can extend from the wireless sensing device on the rim and attach to the tire, e.g., on or in the rubber of the tire.

In embodiments, some electronic components of the wireless sensing device are located inside the rim, and other components are located outside of the rim. The components may be coupled together by portions of an adhesive tape platform or may be coupled together by a wires. The components inside of the rim may be wirelessly coupled to the components located outside of the rim, in some embodiments.

In some embodiments, the system identifies other mechanical/vehicular problems using data analysis of sensor data from the wireless sensing device. Certain tires on the vehicle wearing out faster than other tires may identify problem w/suspension or wheel axle of the vehicle. The system may perform analysis across multiple wheel axles of the vehicle.

In some embodiments, the system uses image processing algorithms to aid in the data analysis of the captured images by cameras and sensors of the wireless sensing devices. For example, the speed of the car or RPM of the wheels may be received from an onboard vehicle system of the vehicle or from one or more sensors of the wireless sensing device. When images captured by the cameras or sensors are blurry, the system may determine that the vehicle is moving too fast to accurately capture the data and time the capture of data to times when the vehicle is moving slower than the respective speed.

In some embodiments, each tire of a vehicle is monitored. A baseline heatmap for each tire is generated based on historical data. When monitoring the tires, the system measure gradation of deviation from the baseline heatmaps. The system may also calculate noisiness/information entropy of the tire and use a cut off filter for the noise to refine the analysis of the sensor data.

The system may generate a bitmap based on the heatmaps created from the sensor or camera data. The bitmap may be compare the differences in pixels from a heatmap that are different from the baseline heatmap.

Data on tires may be used to determine which tires one the same truck are wearing out faster than the others. This analysis may be compared to similar analysis performed on other vehicles across a fleet of vehicles. The system may identify correlations on the heatmap data that correspond to conditions of the vehicle that need repair such as a wheel axle being misaligned. The system may also identify trends on tire manufacturers, vehicle operators, certain trips performed by vehicles, and other trends based on historical data.

In some embodiments, a machine learning model is trained using heatmaps of the tires. The training data may include heatmaps for tires that have no or less wear and tear. The training data may also include heatmaps for tires that have more wear and tear. The machine learning model is trained to classify which heatmaps correspond to tires that have more than a threshold of wear and tear.

The system is beneficial over traditional monitoring system for being capable of noticing in real time that there are trends in what parts of wheel heat up during journeys and for being capable of taking snapshots after X number of journeys, e.g., instantaneous models in time.

In some embodiments, the system detects when a new tire is installed and generates a full heatmap of the newly installed tire. First thousand (or a different number of images) images of new tire may be used as a baseline of a "good" tire (without excessive wear and tear). We can train the machine learning algorithm using the baseline, as well as many other examples/training samples of tires at various stages of wear.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
a plurality of tape nodes associated with a vehicle, each tape node of the plurality of tape nodes being adhered to respective positions on the a vehicle, each tape node of the plurality comprising a time-of-flight sensor oriented downward from the vehicle, and wherein the captured sensor data is time-of-flight data captured by the time-of-flight sensor, and each tape node of the plurality configured to perform operations comprising:
  capturing, by the tape node, sensor data describing a condition of the vehicle, the sensor data comprising time-of-flight sensor data, and
  transmitting, by the tape node, the captured sensor data to a gateway node attached to the vehicle; and
the gateway node attached to the vehicle and associated with the vehicle, wherein the gateway node is configured to perform operations comprising:
  receiving from the plurality of tape nodes, the captured sensor data describing the condition of the vehicle;
  calculating a current height above ground for different portions of the vehicle based at least in part on the received time-of-flight data from the plurality of tape nodes;
  determining, based on the calculated current heights above ground, that the vehicle has experienced an anomalous event, and transmitting a notification of the anomalous event to a user of the system.

2. The system of claim 1, wherein a first tape node of the plurality of tape nodes is a master node configured to communicate with the gateway node of the system and wherein each other tape node of the plurality of tape node is configured to communicate with the first tape node.

3. The system of claim 1, wherein at least one tape node of the plurality of tape nodes is configured to retrieve information describing the vehicle from an onboard system of the vehicle.

4. The system of claim 3, wherein the onboard system of the vehicle is a tire-monitoring system of the vehicle.

5. The system of claim 3, wherein the at least one tape node is further configured to transmit the retrieved information to the system, and wherein the gateway node of the system detects the anomalous event based at least in part on the retrieved information.

6. The system of claim 3, wherein the gateway node is configured to compare the captured sensor data and the retrieved information and, responsive to a conflict between the captured sensor data and the retrieved information, to transmit a notification of the conflict to the user of the system.

7. The system of claim 1, wherein
each of the plurality of tape nodes comprises a Bluetooth communication system, and the gateway node comprises:
a Bluetooth communication system for communicating with the plurality of tape nodes, and
a cellular communication system for communicating with a server.

8. The system of claim 1, wherein the plurality of tape nodes comprises a first tire tape node associated with a first wheel of the vehicle, the first tape node configured to:
determine a temperature profile of a tire installed on the first wheel based on temperature data collected by the first tape node; and
transmit the temperature profile to the gateway node.

9. The system of claim 8, wherein the gateway node detects the anomalous event based also on the temperature profile received from the first tape node.

10. A method comprising:
receiving, by a gateway node attached to a vehicle, sensor data describing a height corresponding to a portion of the vehicle over a wireless communication connection;
determining, by the gateway node, based on the received sensor data, that at least one portion of the vehicle corresponds to the sensor data is experiencing an anomalous event; and
responsive to the determining the at least on portion of the vehicle is experiencing the anomalous event, transmitting, by the gateway node, a notification of the anomalous event to a user of a wireless sensing system associated with the gateway node.

11. The method of claim 10, wherein the plurality of sensors comprises one or more of: a time-of-flight sensor, a light sensor, and an ultrasonic sensor.

12. The method of claim 10, further comprising:
receiving, by the gateway node, information describing the vehicle from an onboard system of the vehicle; and
determining a type of anomalous event based at least in part on the information from the onboard system of the vehicle and the received sensor data.

13. The method of claim 12, further comprising:
detecting, gateway node, a conflict between the information from the onboard system of the vehicle and the received sensor data, wherein the information from the onboard system comprises sensor data collected by the onboard system; and
responsive to the conflict, transmitting a notification of the conflict to the user of the wireless sensing system.

14. The method of claim 10, wherein the received sensor data is transmitted from a tape node attached to a portion of the vehicle.

15. The method of claim 14, wherein the portion of the vehicle comprises a portion of a wheel.

16. A system comprising:
a first tape node associated with a first wheel of a vehicle and comprising a time-of-flight sensor oriented downwards from the vehicle, the first tape node configured to:
capture sensor data, the sensor data comprising time-of-flight sensor data captured by the time-of-flight sensor, and
transmit the captured sensor data to a gateway node attached to the vehicle; and
the gateway node attached to the vehicle and associated with the vehicle, wherein the gateway node is configured to:
receive the sensor data from the first tape node,
calculate a current height above ground of the first tape node based at least in part on the received sensor data, and
determine, based on the calculated current height above ground, that the vehicle has experienced an anomalous event, and
transmit, by the gateway node, a notification of the anomalous event to a user of the system.

17. The system of claim 16, further comprising:
A second tape node associated with a second wheel of the vehicle, second tape node configured to:
capture sensor data describing a condition of the second wheel or a tire installed on the second wheel, and
transmit the captured sensor data to a gateway node attached to the vehicle, wherein
the gateway node is further configured to receive the captured sensor data from the second tape node, and
the data further comprises the received sensor data from the second tape node.

18. The system of claim 16, wherein the gateway node is further configured to transmit the notification of the anomalous event to an associated server.

19. The system of claim 16, wherein the anomalous event corresponds to a detected condition of the first wheel or a tire installed on the first wheel.

20. The system of claim 19, wherein the anomalous event corresponds to the tire installed on the first wheel having a tire pressure lower than a manufacturer's recommended tire pressure.

* * * * *